United States Patent [19]
Haruta et al.

[11] Patent Number: 5,187,716
[45] Date of Patent: Feb. 16, 1993

[54] EXCIMER LASER DEVICE

[75] Inventors: Kenyu Haruta; Haruhiko Nagai; Hajime Nakatani; Yoshihiko Yamamoto; Taketoshi Takemura; Takashi Eura; Shungo Tsuboi; Yoshifumi Matsushita; Tadao Minagawa, all of Amagasaki, Japan

[73] Assignee: Mitsubishi Denki Kabushiki Kaisha, Tokyo, Japan

[21] Appl. No.: 725,098

[22] Filed: Jul. 3, 1991

[30] Foreign Application Priority Data

| Jul. 6, 1990 | [JP] | Japan | 2-180225 |
| Jul. 6, 1990 | [JP] | Japan | 2-180226 |
| Sep. 26, 1990 | [JP] | Japan | 2-254116 |
| Sep. 26, 1990 | [JP] | Japan | 2-254117 |
| Sep. 26, 1990 | [JP] | Japan | 2-254118 |
| Sep. 26, 1990 | [JP] | Japan | 2-254119 |
| Sep. 26, 1990 | [JP] | Japan | 2-254120 |
| Sep. 26, 1990 | [JP] | Japan | 2-254121 |
| Sep. 26, 1990 | [JP] | Japan | 2-254122 |
| Sep. 26, 1990 | [JP] | Japan | 2-254123 |
| Sep. 26, 1990 | [JP] | Japan | 2-254124 |
| Sep. 26, 1990 | [JP] | Japan | 2-254125 |
| Sep. 27, 1990 | [JP] | Japan | 2-255131 |
| Sep. 27, 1990 | [JP] | Japan | 2-255132 |
| Sep. 28, 1990 | [JP] | Japan | 2-256976 |
| Apr. 22, 1991 | [JP] | Japan | 3-090328 |

[51] Int. Cl.⁵ ............................................. H01S 3/22
[52] U.S. Cl. ........................................ 372/57; 372/55; 372/87; 372/88
[58] Field of Search .................... 372/57, 55, 87, 88

[56] References Cited

U.S. PATENT DOCUMENTS

| 3,653,960 | 4/1972 | MacNair | 117/221 |
| 4,017,808 | 4/1977 | Fein et al. | 372/55 |
| 4,344,905 | 8/1982 | Chilcot | 204/111 |
| 4,817,096 | 3/1989 | Nighan et al. | 372/57 |
| 4,860,300 | 8/1989 | Bäumler et al. | 372/57 |
| 5,043,997 | 8/1991 | Morrow et al. | 372/87 |

FOREIGN PATENT DOCUMENTS

| 4007309 | 10/1990 | Fed. Rep. of Germany . |
| 3920634 | 1/1991 | Fed. Rep. of Germany . |
| 48484 | 3/1983 | Japan . |

OTHER PUBLICATIONS

I. E., Kanter et al, Surface Metallization Studies for Excimer Laser Electrodes, Apr. 1979, pp. 119-120.

Primary Examiner—Georgia Y. Epps
Attorney, Agent, or Firm—Sughrue, Mion, Zinn, Macpeak and Seas

[57] ABSTRACT

At least the opposing surface portions of the main electrodes of an excimer laser device are covered with materials which are resistive to chemical etching than nickel. The etching resistive material may be a platinum based alloy containing rhodium, ruthenium, iridium, or osmium; a nickel based alloy containing gold, platinum, rhodium, ruthenium, iridium, or osmium; or rhodium, ruthenium, iridium, or osmium. Thus, an excimer laser device is realized by which the lives of the electrodes and the laser gas are prolonged.

23 Claims, 20 Drawing Sheets

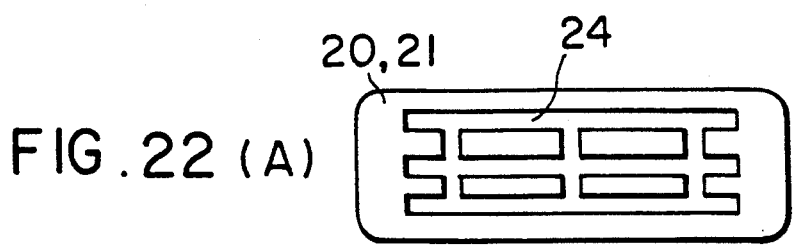
FIG. 22 (A)
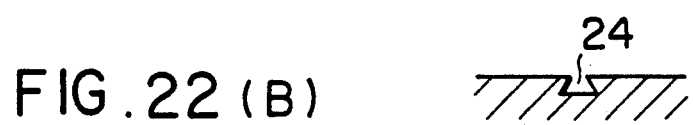
FIG. 22 (B)
FIG. 22 (C)
FIG. 22 (D)
FIG. 22 (E)
FIG. 23
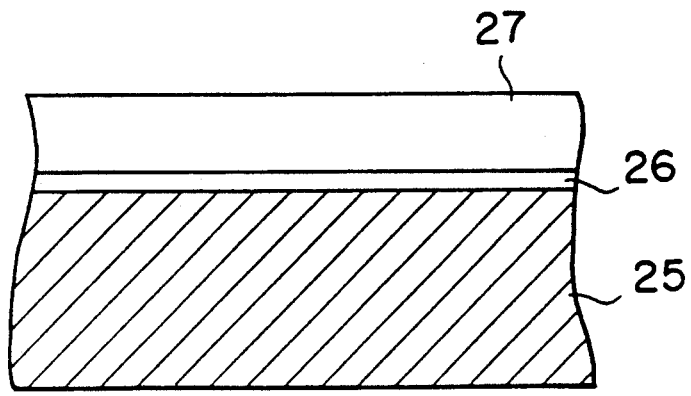

EXCIMER LASER DEVICE

BACKGROUND OF THE INVENTION

This invention relates to excimer laser devices, and more particularly to the electrodes of the excimer laser devices.

FIG. 29 is a diagrammatic sectional view of the discharge region of a conventional excimer laser device. Housed within a laser box 1 are a first main electrode 2 and a second main electrode 3, across which a main discharge 4 is formed.

The method of operation of the excimer laser device is as follows.

Excimer lasers are the lasers that utilize as the laser medium a rare gas such as krypton (Kr), xenon (Xe), and argon (Ar), and a halogen gas such as fluorine (F) and chlorine (Cl). For example, a laser medium made of a mixture of fluorine (F) and krypton (Kr) is filled into the laser box 1 together with a buffer gas made of helium (He) or neon (Ne). A high voltage is applied across the first main electrode 2 and the second main electrode 3. As a result, the main discharge 4 is formed across the first main electrode 2 and the second main electrode 3. Krypton (Kr) and fluorine (F), which are without mutual interaction in the ground state, undergo reactions to form excimer molecules of krypton fluoride (KrF). The life of excimer molecules is short, and the excimer molecules soon return to the ground state to be divided into the original fluorine (F) and krypton (Kr), emitting ultraviolet light during this dissociation process. The light is intensified in accordance with the principle of stimulated emission, to be taken out from the laser box 1.

The above conventional excimer laser generally has the following disadvantage with respect to the structure and the method of operation.

(1) Since a highly reactive halogen gas is utilized, the gas itself deteriorates as the operation is repeated.

(2) A pulse discharge at a period of several tens to several hundreds of nanoseconds and at a peak current level of several tens of kiloamperes is utilized. Thus, the consumption or erosion of the electrodes is rapid. Long continuous operations result in a reduction of the laser output or a change in the laser beam frequency pattern.

With respect to the problem (1), nickel (Ni) or a nickel alloy having a low reactivity to the halogen gases is a good candidate for the base or coating material of electrodes. However, for the purpose of preventing deterioration of the laser gas, platinum (Pt) or gold (Au) is proposed as a better material for forming or coating the metal portion of the main electrodes. (See an article by R. Tenant in *Laser Focus*, Vol. 17, No. 10, p. 65, 1981.) Further, it is reported that platinum (Pt) is a good electrode material for suppressing the gas deterioration in the case of carbon dioxide ($CO_2$) laser. (See an article by E. N. Lotkobo and V. N. Sobolev in *IEEE Journal of Quantum Electronics*, Vol. QE-7, No. 8, p. 396, 1971.) Further, platinum (Pt) is reported as a good material for the discharge electrodes within fluorine (F) gas. (See an article by S. Maeda et aluminum (Al) in *Denki Gakkai Zasshi (Journal of the Institute of Electrical Engineers)* Vol. 9, No. 8, p. 1447, 1971.)

With respect to the problem (2) above, i.e., the problem of the consumption of the electrodes, the main cause therefor is deemed to be the physical sputtering of electrodes caused by ions and electrons hitting upon them. Thus, it has generally been accepted that high melting point materials or materials having high hardness, such as tungsten (W) or molybdenum (Mo), are good for the electrodes for suppressing this problem. However, experiments conducted by the inventors on the life of molybdenum (Mo) electrodes show that the molybdenum (Mo) electrodes are eroded 180 $\mu$m after $1 \times 10^8$ shots. The result is even worse than in the case of conventional nickel (Ni) electrodes, which is eroded 180 $\mu$m after $3 \times 10^8$. Further, the molybdenum (Mo) electrodes react actively with the halogen gas, and thereby reduce the halogen concentration in the laser gas. The laser output is thus reduced conspicuously. Consequently, it has been found that the molybdenum (Mo) or tungsten (W) material cannot be used for the electrodes of the excimer laser.

According to Japanese Patent Laid-Open (Kokai) No. 63-20476, the metals or alloys which are effective for preventing gas deterioration include molybdenum (Mo), tungsten (W), platinum (Pt), gold (Au), hastelloy, and inconel. The Japanese Patent Laid-Open (Kokai) No. 63-20476, however, does not show any data concerning electrode erosion.

The present inventors have found on the basis of a research and experiments on the gas deterioration and electrode erosion that those portions of the excimer laser device other than electrodes that are in contact with the laser gas (for example, the heat exchanger portion or the laser box which have large area exposed to the gas) are the main factors in determining the life of the gas.

FIG. 30 is a diagram showing the gas lives for an electrode the whole surface of which is covered with a platinum (Pt) layer (curve A) and a nickel (Ni) electrode without a coating (curve B). Parts of the excimer laser device other than the electrodes are made of the same materials. The figure shows that the gas lives for two electrodes A and B exhibit little difference.

It can be concluded from the result of FIG. 30 that it is unnecessary with respect to the gas life to cover the whole surface of the electrode with platinum (Pt) or gold (Au).

FIG. 31 is a diagram showing the deformation (the depth of erosion) of the electrodes due to sputtering, etc., in long life tests. The input power is 50 J/liter (joules per liter). The curve A corresponds to the case of nickel (Ni) electrodes, while the curve B corresponds to the case where the opposing surfaces of nickel (Ni) electrodes were covered with a platinum (Pt) layer of about 80 $\mu$m. As shown in the figure, the nickel (Ni) electrodes are eroded about 180 $\mu$m after $3 \times 10^8$ shots. On the other hand, the electrodes covered with a platinum (Pt) layer are eroded only about 40 $\mu$m after $3 \times 10^8$ shots.

FIG. 32 is a diagram showing the changes of output beam band pattern (half-value wavelength width of the output beam) and the laser output due to electrode deformation (erosion). In the case of nickel (Ni) electrodes, the beam pattern (curve A) changes markedly and the laser output (curve C) decreases conspicuously due to the above electrode deformation. On the other hand, in the case of electrodes covered with a platinum (Pt) layer, the beam pattern (curve B) and the laser output (curve D) do not exhibit any appreciable changes. (In the figure the curves B and D are shown with small vertical displacements to distinguish them from the overlapping portions of the curves A and C.) The result shows clearly the effectiveness of covering the electrodes with a platinum (Pt) layer. The result of the experiment thus shows that not only the sputtering via ions and electrons but also reactions with halogens substantially contribute to the consumption or erosion of the electrodes. Furthermore, the experiment has shown that the erosion of the anode is greater than that of the cathode. It is thus inferred that active species such as negative ions of fluorine (F) contribute substantially to the electrode consumption. Thus, the electrode life can substantially be prolonged even by covering only the opposing surfaces of the electrodes with a platinum (Pt) or gold (Au) layer.

FIG. 33 is a schematic enlarged side view of the main discharge generated across the electrodes. The most part of the main discharge 4 consists of glow discharge 4c, which includes, in the case shown in the figure, cathode spots 4a appearing on the surface of the first main electrode 2 at the cathode side, and streamers 4b extending from the cathode spots 4a. In the case of excimer lasers, only the glow discharge 4c is observed when the discharge current is small. However, when the discharge current is increased so as to enhance the laser oscillation efficiency, the cathode spots 4a and the streamers 4b appear. This is due to the fact that since the current supply capacity of the first main electrode 2 constituting the cathode is not sufficient, localized regions of extremely high temperature (i.e., the cathode spots) are generated, thereby supplying current into the discharge space by means of thermal electron emission having a greater current supplying capacity. The experiments conducted by the inventors have shown that the erosion of the electrodes is especially conspicuous where the cathode spots 4a are generated.

As shown in FIG. 34, the direction of the discharge current of an excimer laser is inverted for a short time after the operation of the excimer laser begins. However, the cathode spots 4a are generated on the first main electrode 2 which functions primarily as the cathode.

Further, it is reported that the erosion or consumption of the electrodes is reduced by adding to tungsten (W) electrodes oxides such as yttrium oxide ($Y_2O_3$), zirconium oxide ($ZrO_2$), cerium oxide ($CeO_2$), thorium oxide ($ThO_2$), and lanthanum oxide ($La_2O_3$). (See material EP-87-44, P25-P33, 87, of *Denki Gakkai Hodenkenkyukai* (*Discharge Research Committee of the Institute of Electrical Engineers*)) However, as described above, the tungsten (W) electrodes have problems with respect to the gas and electrode life to be utilized in the excimer laser.

Where the reactivity with respect to the halogen gases is sufficiently small, the factors which affect the electrode erosion include, in addition to the above, such factors as: (1) the resistance to the evaporation and dissipation, etc., (the changes of the thermal characteristics with respect to melting point, boiling point, the vapor pressure, etc.) due to sputtering of electrodes caused by ions and electrons hitting on the electrodes or due to the energy injection by means of the ions and electrons; and (2) mechanical resistance to the thermal fatigue resulting from localized temperature rise of the electrodes. With respect to these factors, platinum (Pt) is far superior to gold (Au) with regard to the thermal characteristics.

Platinum (Pt) is thus chemically stable, is not susceptible to deterioration caused by the laser gas, does not occasion gas deterioration, and is thermally stable such that only a small amount is dissipated by the injected energy. However, there still remains room for the improvement of platinum (Pt) electrodes with respect to the electrode erosion and thermal and chemical characteristics.

Thus, in summary, the conventional excimer laser device has the following disadvantage.

The nickel (Ni) electrodes easily undergo electrode deformation resulting from electrode consumption. As a result, the discharge becomes unstable, or the laser output is reduced.

On the other hand, although the electrodes whose main portions are covered with platinum (Pt) are effective for suppressing the problem of nickel (Ni) electrodes, the consumption of electrodes cannot totally be suppressed. Further, platinum (Pt) substantially increases the production cost of the excimer laser device.

SUMMARY OF THE INVENTION

It is therefore an object of this invention to provide a reliable excimer laser device having improved electrode characteristics, the production cost of which is within a economically feasible range.

The above object is generally accomplished in accordance with the principle of this invention by an excimer laser device having a pair of main electrodes for forming a discharge for excitation, in which at least the surface portion of one of the main electrodes opposing the other one of the main electrodes is covered with an etching resistive material more resistive to chemical etching than nickel (Ni).

According to a first aspect of this invention, at least the opposing surfaces of the electrodes of the excimer laser device are covered with an etching resistive layer made of a platinum (Pt) based alloy consisting of: platinum (Pt) as the primary component and an element selected from the group consisting of rhodium (Rh), ruthenium (Ru), iridium (Ir), and osmium (Os); or platinum (Pt) as the primary element and two or more elements selected from the same group. The addition to the platinum (Pt) of rhodium (Rh), ruthenium (Ru), iridium (Ir), or osmium (Os), or two or more thereof according to this aspect improves the thermal characteristics of electrodes without impairing the chemical characteristics, and thereby reduces the electrode consumption (erosion). For example, the addition of rhodium (Rh) to platinum (Pt) raises the melting temperature and increases the mechanical strength. Addition of rhodium (Rh) up to 50% raises the melting point of the alloy remarkably. However, the melting point of the alloy rises only slowly thereafter. Thus, the effectiveness of adding more than 50% of expensive rhodium (Rh) for the purpose of improving the performance of electrodes is questionable from an economical view point. It is noted that an addition of a few percent of rhodium (Rh) significantly improves the thermal and mechanical characteristics of the electrodes. Ruthenium (Ru), iridium (Ir), and osmium (Os) have melting and boiling points higher than those of platinum (Pt) or rhodium (Rh). Thus, the addition of one or more of these elements further improves the mechanical characteristics without impairing the thermal characteristics, and thus reduces damage to the electrodes.

According to a second aspect, at least the opposing surfaces of the electrodes of the excimer laser device are covered with an etching resistive layer made of a nickel (Ni) based alloy consisting of: nickel (Ni) as the primary component and an element selected from the group consisting of gold (Au), platinum (Pt), rhodium (Rh), ruthenium (Ru), iridium (Ir), and osmium (Os); or nickel (Ni) as the primary component and two or more elements selected from the same group. Forming a nickel (Ni) based alloy by adding to primary component nickel (Ni) an additive gold (Au), platinum (Pt), rhodium (Rh), ruthenium (Ru), iridium (Ir), or osmium (Os), or two or more additives selected from these elements according to this aspect, the chemical characteristics of the alloy are remarkably enhanced, and the mechanical properties and thermal characteristics (except for the alloy of nickel (Ni) and gold (Au)) are improved. Thus, the electrode erosion is effectively reduced.

For example, although the addition of up to 50% platinum (Pt) to nickel (Ni) does not substantially change the melting point (addition of further platinum (Pt) raises the solidus curve temperature), such addition does lower the vapor pressure of the alloy as a whole thanks to the high melting point of the added platinum (Pt), and hence reduces the erosion due to evaporation of the electrodes. Further, the addition of platinum (Pt) increases the mechanical strength. The addition to nickel (Ni) of rhodium (Rh), ruthenium (Ru), iridium (Ir), and osmium (Os) has substantially the same meritorious effects as the addition of platinum (Pt).

On the other hand, the addition of gold (Au) remarkably improves the chemical and mechanical characteristics. Such addition results in a reduction of thermal characteristic temperatures such as the melting and evaporation temperature (addition of up to 20% gold (Au) lowers the solidus curve temperature and the liquidus curve temperature). However, the improvement of the chemical characteristics with respect to halogen gases resulting from the addition of gold (Au) significantly reduces the electrode erosion compared with the case of pure nickel (Ni) electrodes.

The addition of two or more elements selected from platinum (Pt), rhodium (Rh), ruthenium (Ru), iridium (Ir), and osmium (Os) improves the mechanical characteristics without impairing the chemical and thermal characteristics, and thereby reduces damage to the electrodes.

According to a third aspect, at least the opposing surfaces of the electrodes of the excimer laser device are covered with an etching resistive layer made of a metal selected from the group consisting of rhodium (Rh), ruthenium (Ru), iridium (Ir), and osmium (Os); or of an alloy consisting of a primary component element selected from the same group and one or more additive elements selected from the same group. Rhodium (Rh), ruthenium (Ru), iridium (Ir), or osmium (Os) exhibit equivalent reactivity with respect to halogen gases as platinum (Pt), but have a higher melting point and boiling point (except for rhodium (Rh)) than platinum (Pt), the unary metal of these elements having higher mechanical strength than platinum (Pt). Thus, the unary metals or alloys thereof exhibit chemical characteristics equivalent to platinum (Pt) and thermal and mechanical characteristics superior to platinum (Pt). Consequently, they realize electrodes of an excimer laser device more resistant to erosion than platinum (Pt).

According to a fourth aspect, at least the opposing surfaces of the electrodes of the excimer laser device are covered with an etching resistive layer made of a platinum (Pt) or gold (Au) based alloy consisting of: platinum (Pt) and zirconium oxide ($ZrO_2$); or platinum (Pt), rhodium (Rh), and zirconium oxide ($ZrO_2$); or platinum (Pt), rhodium (Rh), and thorium oxide ($ThO_2$); or gold (Au) and rhodium (Rh); or gold (Au) and zirconium oxide ($ZrO_2$); or gold (Au), rhodium (Rh), and zirconium oxide ($ZrO_2$); or gold (Au), rhodium (Rh), and thorium oxide ($ThO_2$). The alloys according to this aspect realize erosion-resistant electrodes of long life without impairing the long life characteristics of the laser gas.

According to a fifth aspect, at least the opposing surfaces of the electrodes of the excimer laser device are covered with an etching resistive layer made of a platinum (Pt) based alloy consisting of the primary component platinum (Pt) and additive gold (Au), or a gold (Au) based alloy made of the primary component gold (Au) and additive platinum (Pt). The alloys according to this aspect realize erosion-resistant long life electrodes by which the deterioration of the laser gas of the excimer laser device is reduced.

According to a sixth aspect, at least the opposing surface of one of the main electrodes of the excimer laser device is covered by an etching resistive alloy material consisting of a high-melting point metal as the primary component and an additive metal resistive to halogen gases. Preferably, both the main electrodes or at least the cathode is covered by the etching resistive material. Thus, according to this aspect, the amount of consumption of the electrodes covered with the etching resistive material is effectively reduced. Further, it is preferred that the etching resistive material is made of an alloy consisting of: a high-melting point metal selected from the group consisting of rhodium (Rh), ruthenium (Ru), iridium (Ir), and osmium (Os); and a halogen resistive metal selected from the group consisting of platinum (Pt) and gold (Au).

According to a seventh aspect, at least the opposing surface of one of the main electrodes is covered with an etching resistive material made of a metal based material consisting of: a primary component metal having a low reactivity with respect to halogen gases; and an additive oxide or compound or mixture of oxide and compound having a work function not exceeding 4 eV. The addition of the oxide or compound or mixture thereof facilitates the emission of electrons from the electrodes. Thus, the generation of the cathode spots is suppressed, and hence the localized overheating of the cathode electrode can be prevented.

According to an eighth aspect, at least the surface portion of the anode opposing the cathode is made of a metal or alloy having a low reactivity with respect to halogen gases, and at least the surface portion of the cathode opposing the anode is made either of a high-melting point metal or alloy material or of a material which easily emits electrons. The metal or alloy materials having low reactivity with respect to halogen gases include: gold (Au), platinum (Pt), rhodium (Rh), ruthenium (Ru), iridium (Ir), palladium (Pd), osmium (Os), and an alloy consisting of one or more of these elements. Alternatively, the metal or alloy material having a low reactivity with respect to halogen gases may be a nickel (Ni) based (balance Ni) alloy consisting of: balance nickel (Ni) as the primary component; and one or more elements selected from the group consisting of: gold (Au), platinum (Pt), rhodium (Rh), ruthenium (Ru), iridium (Ir), palladium (Pd), and osmium (Os). Still alternatively, the metal or alloy material having low reactivity with respect to halogen gases may be either an alloy of platinum (Pt), rhodium (Rh), and zirconium oxide ($ZrO_2$), or an alloy of platinum (Pt), rhodium (Rh), and thorium oxide ($ThO_2$).

On the other hand, the high melting point alloy may consist of platinum (Pt) and one or more elements selected from the group consisting of rhodium (Rh), ruthenium (Ru), iridium (Ir), and osmium (Os). Alternatively, the high-melting point metal or alloy material may be: a metal selected from the group consisting of rhodium (Rh), ruthenium (Ru), iridium (Ir), and osmium (Os); or an alloy consisting of a primary element selected from the same group and one or more additive elements selected from the same group.

The material which easily emits electrons may consist of: nickel (Ni) or a metal having low reactivity with respect to halogen gases, as a primary component; and an additive consisting of one or more oxides or compounds which have a work function not exceeding 4 eV.

According to a ninth aspect, at least the anode of the excimer laser device is covered with a platinum (Pt) layer not less than 20 μm thick. Thus, the electrode consumption is reduced and the electrode life is prolonged without increasing the cost too much, thereby realizing a excimer laser device of high-reliability.

According to a tenth aspect, only the surface portions of the main electrodes opposing the other electrode, or only the surface portion of the anode opposing the cathode are covered with a platinum (Pt) or gold (Au) layer. Thus, long life electrodes with smaller electrode consumption can be realized without wasting expensive platinum (Pt) or gold (Au). As a result, an excimer laser device of high reliability can be realized.

According to an eleventh aspect, at least one of the main electrodes has a form of a hollow cylinder or a portion of a hollow cylinder made of: platinum (Pt), gold (Au), or a platinum (Pt) or gold (Au) based alloy including platinum (Pt) or gold (Au) as the primary component. According to this aspect, the life of the main electrodes can be prolonged without increasing the cost inordinately.

According to a twelfth aspect, the main electrodes consist of a base material and a layer of an etching resistive material covering an outer surface of the base material, wherein the base material has a heat conductivity greater than that of the etching resistive material of the surface layer.

According to a thirteenth aspect, the opposing surfaces of each nickel (Ni) base portion of the main electrodes have a plurality of grooves formed thereon to render it rough, and a plate made of a metal selected from the group consisting of: platinum (Pt), rhodium (Rh), ruthenium (Ru), iridium (Ir), osmium (Os), or an alloy consisting of two or more elements selected from the same group is securely attached to said opposing surface of the plate. Since the opposing surface of the main electrode is rendered rough by means of the grooves, the plate is attached securely thereon. The plate on the opposing surface of the electrode thus does not develop micro-cracks, etc., and has a uniform section. Consequently, the discharge current can be supplied smoothly.

According to a fourteenth aspect, the surfaces of the main electrodes are coated with platinum (Pt) or gold (Au), and at least a layer of another material is interposed between the platinum (Pt) or gold (Au) coating and the base of the main electrodes. According to this aspect, the adhesion of the platinum (Pt) or gold (Au) layer to the base material of the electrodes is enhanced.

According to a fifteenth aspect, the surfaces of the main electrodes are coated with platinum (Pt), wherein a metal having a standard electrode potential difference of not greater than 1 V with respect to platinum (Pt) is coated on the base material of the main electrodes to form a substrate metal for the platinum (Pt) coating layer. According to this aspect, when the platinum (Pt) is coated via the electroplating process, the substrate metal having a standard potential difference not greater than 1 V is not dissolved into the plating bath.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 22 shows the plan view of the opposing surface of the nickel (Ni) base material of the main electrode (A), together with the various forms of the sections of the grooves formed on the nickel (Ni) base material of the main electrode (B) through (E);

FIG. 23 shows schematically the micrograph of platinum (Pt) plating according to the fourteenth aspect of this invention, taken by a metallurgical microscope;

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

According to a first aspect of this invention, at least the opposing surfaces of the electrodes of the excimer laser device are covered with an etching resistive layer made of a platinum (Pt) based alloy consisting of: platinum (Pt) as the primary component and an element selected from the group consisting of rhodium (Rh), ruthenium (Ru), iridium (Ir), and osmium (Os); or platinum (Pt) as the primary element and two or more elements selected from the same group.

The addition to the platinum (Pt) of rhodium (Rh), ruthenium (Ru), iridium (Ir), or osmium (Os), or two or more thereof according to this aspect improves the thermal characteristics of electrodes without imparing the chemical characteristics, and thereby reduces the electrode consumption (erosion). For example, the addition of rhodium (Rh) to platinum (Pt) raises the melting temperature and increases the mechanical strength. The addition of rhodium (Rh) up to 50% raises the melting point of the alloy remarkably. However, the melting point of the alloy rises only slowly thereafter. Thus, the effectiveness of adding more than 50% of expensive rhodium (Rh) for the purpose of improving the performance of the electrodes is questionable from an economical view point. It is noted that an addition of a few percent of rhodium (Rh) significantly improves the thermal and mechanical characteristics of the electrodes.

Ruthenium (Ru), iridium (Ir), and osmium (Os) have melting and boiling points higher than those of platinum (Pt) or rhodium (Rh). Thus, the addition of one or more of these elements further improves the mechanical characteristics without impairing the thermal characteristics, and thus reduces the damage to the electrodes.

Figure 1:
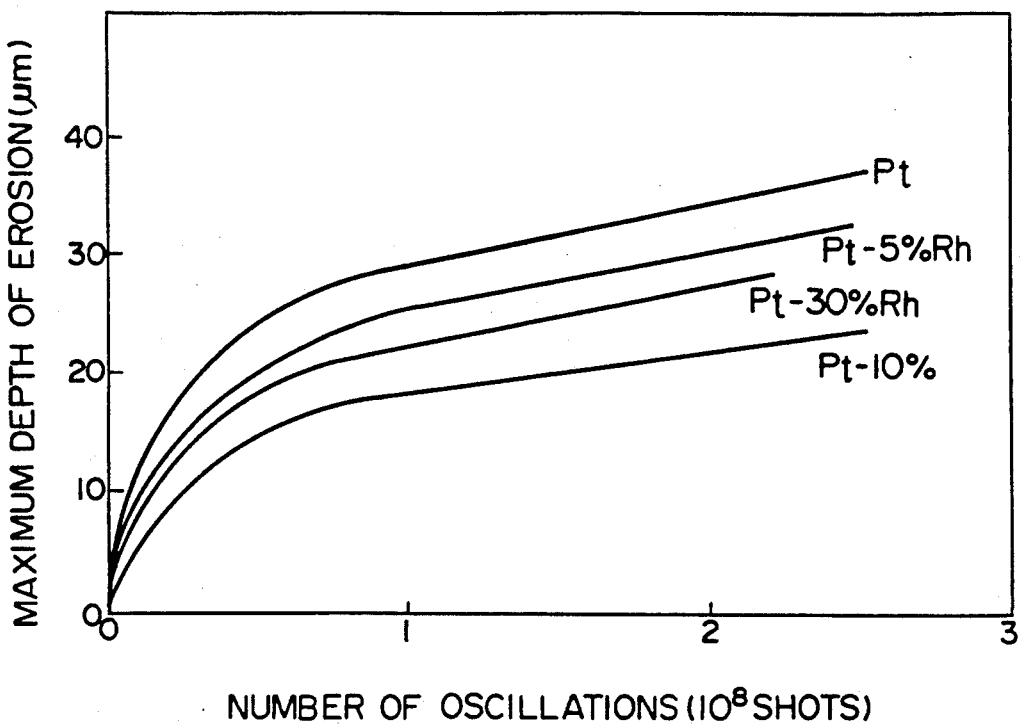
FIG. 1 is a diagram showing the depths of erosion of electrodes the opposing surfaces of which are covered with a layer having compositions according to the first aspect of this invention.

FIG. 1 is a diagram showing the depths of erosion of electrodes the opposing surfaces of which are covered with a layer having compositions according to the first aspect of this invention. As shown in FIG. 1, the electrodes the opposing surfaces of which are covered with an alloy layer of PT-5% Rh, Pt-30% Rh, and Pt-10% Ir, respectively, exhibit significantly less electrode erosion than the pure platinum (Pt) electrode. The alloy layers have been attached as foils 200 μm thick on respective nickel (Ni) base electrodes, and the adhesion of the layers to the base have been enhanced by means of an electron beam scanning process.

According to this first aspect, the preferred range of rhodium (Rh) is from 5% to 80%, that of iridium (Ir) is from 5% to 80%, that of ruthenium (Ru) is from 5% to 80%, and that of osmium (Os) is from 5% to 80%.

It is to be noted that the contents of elements are specified by percentage by weight in this specification unless expressly stated otherwise.

According to a second aspect of this invention, at least the opposing surfaces of the electrodes of the excimer laser device are covered with an etching resistive layer made of a nickel (Ni) based alloy consisting of: nickel (Ni) as the primary component and an element selected from the group consisting of gold (Au), platinum (Pt), rhodium (Rh), ruthenium (Ru), iridium (Ir), and osmium (Os); or nickel (Ni) as the primary component and two or more elements selected from the same group.

Forming a nickel (Ni) based alloy by adding to primary component nickel (Ni) an additive gold (Au), platinum (Pt), rhodium (Rh), ruthenium (Ru), iridium (Ir), or osmium (Os), or two or more additives selected from these elements according to this aspect, the chemical characteristics of the alloy are remarkably enhanced, and the mechanical properties and thermal characteristics (except for the alloy of nickel (Ni) and gold (Au)) are improved. Thus, the electrode erosion is effectively reduced.

For example, although the addition of up to 50% platinum (Pt) to nickel (Ni) does not substantially change the melting point (addition of further platinum (Pt) raises the solidus curve temperature), such addition does lower the vapor pressure of the alloy as a whole thanks to the high melting point of the added platinum (Pt), and hence reduces the erosion due to evaporation of the electrodes. Further, the addition of platinum (Pt) increases the mechanical strength.

The addition to nickel (Ni) of rhodium (Rh), ruthenium (Ru), iridium (Ir), and osmium (Os) has substantially the same meritorious effects as the addition of platinum (Pt).

On the other hand, the addition of gold (Au) remarkably improves the chemical and mechanical characteristics. Such addition results in a reduction of thermal characteristic temperatures such as the melting and evaporation temperature (addition of up to 20% gold (Au) lowers the solidus curve temperature and the liquidus curve temperature). However, improvement of the chemical characteristics with respect to halogen gases resulting from the addition of gold (Au) significantly reduces the electrode erosion compared with the case of pure nickel (Ni) electrodes.

The addition of two or more elements selected from platinum (Pt), rhodium (Rh), ruthenium (Ru), iridium (Ir), and osmium (Os) improves the mechanical characteristics without impairing the chemical and thermal characteristics, and thereby reduces damage to the electrodes.

Figure 2:
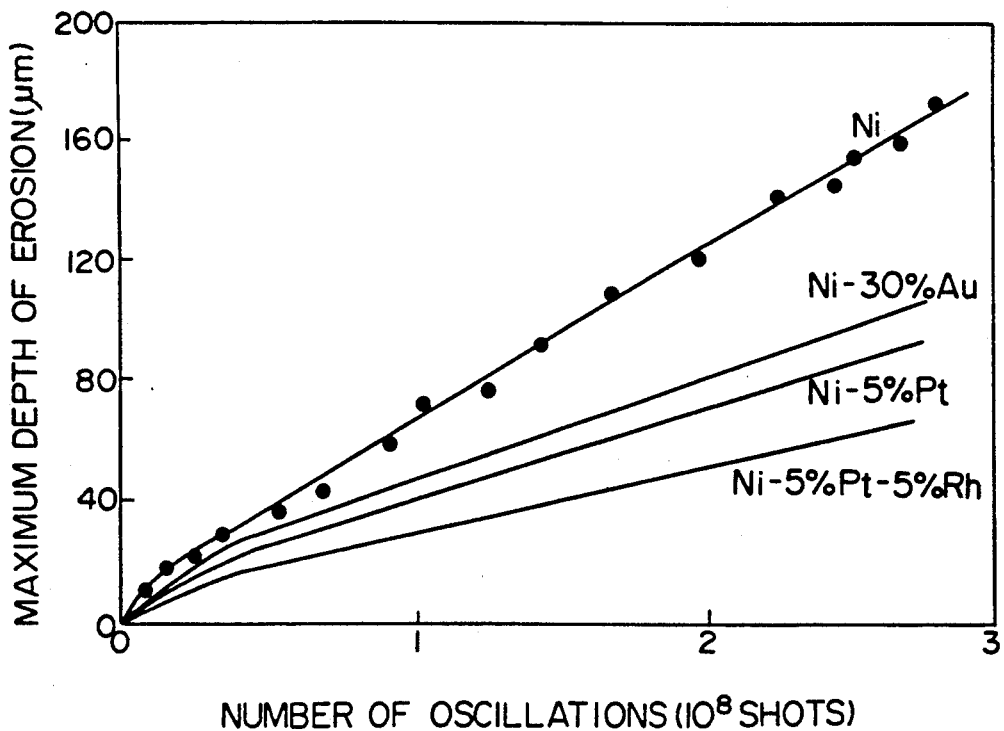
FIG. 2 is a diagram showing the depths of erosion of electrodes the opposing surfaces of which are covered with a layer having compositions according to the second aspect of this invention.

FIG. 2 is a diagram showing the depths of erosion of electrodes the opposing surfaces of which are covered with a layer having compositions according to the second aspect of this invention. The electrodes the opposing surfaces of which are covered with an alloy layer of Ni-30% Au, Ni-5% Pt, and Ni-5% Pt-5% Rh, respectively, exhibit significantly less electrode erosion than a pure nickel (Ni) electrode. The alloy layers have been attached as 200 μm thick foils on respective nickel (Ni) base electrodes, and the adhesion of the layers to the base has been enhanced by means of electron beam scanning. The alloy lasers may be formed by plating the respective metals on a nickel (Ni) base, thereafter heating and diffusing the metals to form the alloy layers.

According to this aspect, when a single element is added to nickel (Ni), the preferred range of gold (Au) is from 5% to 50%, that of platinum (Pt) is from 5% to 50%, that of rhodium (Rh) is from 5% to 50%, that of ruthenium (Ru) is from 5% to 50%, that of iridium (Ir) is from 5% to 50%, and that of osmium (Os) is from 5% to 50%.

According to a third aspect of this invention, at least the opposing surfaces of the electrodes of the excimer laser device are covered with an etching resistive layer made of a metal selected from the group consisting of rhodium (Rh), ruthenium (Ru), iridium (Ir), and osmium (Os); or of an alloy consisting of a primary component element selected from the same group and one or more additive element or elements selected from the same group.

Rhodium (Rh), ruthenium (Ru), iridium (Ir), or osmium (Os) exhibit equivalent reactivity with respect to halogen gases as platinum (Pt), but have a higher melting point and boiling point (except for rhodium (Rh)) than platinum (Pt), the unary metal of these elements having higher mechanical strength than platinum (Pt). Thus, the unary metals or alloys thereof exhibit chemical characteristics equivalent to platinum (Pt) and thermal and mechanical characteristics superior to platinum (Pt). Consequently, they realize electrodes of excimer laser devices more resistant to erosion than platinum (Pt).

Figure 3:
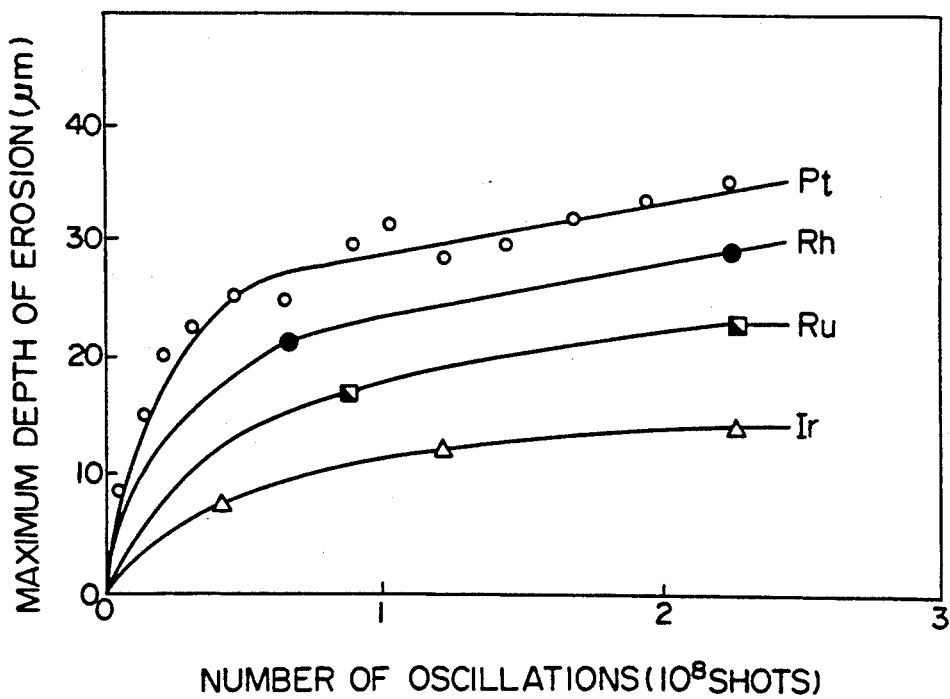
FIG. 3 is a diagram showing the depths of erosion of electrodes the opposing surfaces of which are covered with a layer having compositions according to the third aspect of this invention.

FIG. 3 is a diagram showing the depths of erosion of electrodes the opposing surfaces of which are covered with a layer having compositions according to the third aspect of this invention. As shown in FIG. 3, the electrodes the opposing surfaces of which are covered with a layer of rhodium (Rh), ruthenium (Ru), and iridium (Ir), respectively, exhibit significantly less electrode erosion than pure platinum (Pt). The layers have been attached as 200 μm thick foils on respective nickel (Ni) base electrodes, and the adhesion of the layers to the base has been enhanced by means of electron beam scanning.

By the way, the case of electrodes covered with an osmium (Os) layer is not shown in FIG. 3. However, osmium (Os) has thermal and mechanical characteristics far superior to platinum (Pt), rhodium (Rh), ruthenium (Ru), and iridium (Ir). Thus the electrodes of osmium (Os) are expected to exhibit the same or superior meritorious effects.

According to a fourth aspect of this invention, at least the opposing surfaces of the electrodes of the excimer laser device are covered with an etching resistive layer made of a platinum (Pt) or gold (Au) based alloy consisting of: platinum (Pt) and zirconium oxide ($ZrO_2$); or platinum (Pt), rhodium (Rh), and zirconium oxide ($ZrO_2$); or platinum (Pt), rhodium (Rh), and thorium oxide ($ThO_2$); or gold (Au) and rhodium (Rh); or gold (Au) and zirconium oxide ($ZrO_2$); or gold (Au), rhodium (Rh), and zirconium oxide ($ZrO_2$); or gold (Au), rhodium (Rh), and thorium oxide ($ThO_2$).

The alloys according to this aspect realize erosion-resistant electrodes of long life without impairing the long life characteristics of the laser gas.

Figure 4:
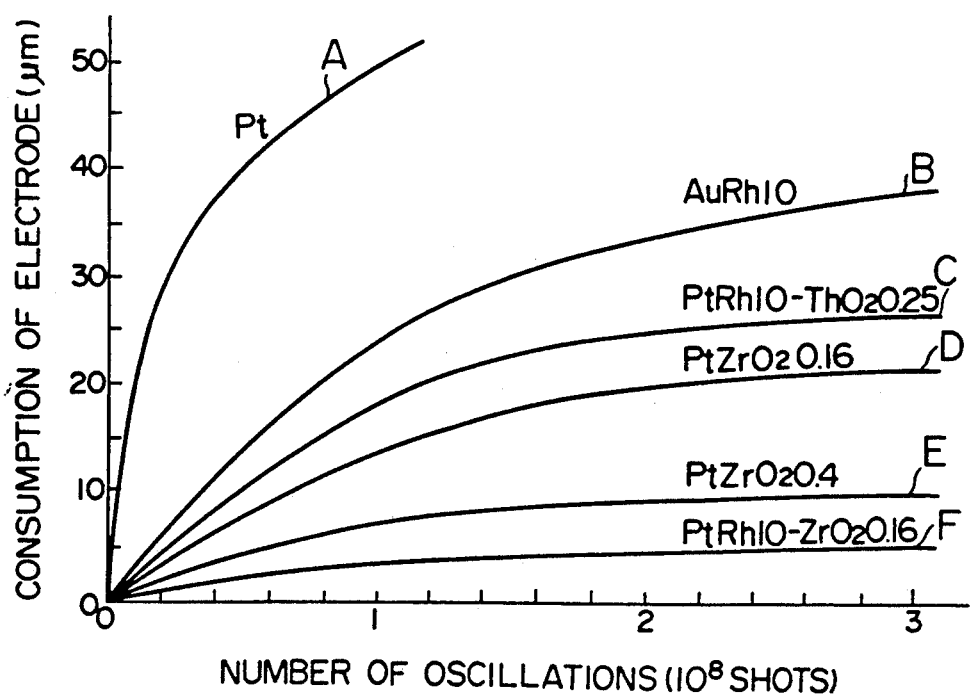
FIG. 4 is a diagram showing the electrode deformation (erosion) due to sputtering, etc., in the long life tests conducted for electrodes the opposing surfaces of which are covered with a layer having compositions according to the fourth aspect of this invention.

FIG. 4 is a diagram showing the electrode deformation (erosion) due to sputtering, etc., in the long life tests conducted for electrodes the opposing surfaces of which are covered with a layer having compositions according to the fourth aspect of this invention. The input power to the excimer laser device is 50 J/liter. The curve A shows the case of electrodes made of platinum (Pt); the curve B shows the case of electrodes made of gold (Au) and 10% rhodium (Rh); the curve C shows the case of electrodes made of platinum (Pt), 10% rhodium (Rh), and 0.25% thorium oxide (ThO$_2$); the curve D shows the case of electrodes made of platinum (Pt) and 0.16% zirconium oxide (ZrO$_2$); the curve E shows the case of electrodes made of platinum (Pt) and 0.4% zirconium oxide (ZrO$_2$); and the curve F shows the case of platinum (Pt), 10% rhodium (Rh), and 0.16% zirconium oxide (ZrO$_2$).

As seen from FIG. 4, the platinum (Pt) electrode is eroded about 50 μm after $1 \times 10^9$ shots. The erosion is remarkably reduced in the case of the electrodes made of alloys B through F.

In FIG. 4, except the curve B, the examples are those of platinum (Pt) based alloys. It is to be noted, however, gold (Au) based alloys exhibit the same meritorious effects as the platinum (Pt) based alloys. Further, the base material of the electrodes on which the alloy layers according to this aspect are attached may be other than nickel (Ni). Furthermore, as has been pointed out above, it is not necessary to cover the whole surface of the main electrodes. At least those areas which are affected by the discharge must be covered by the resistive layer.

According to the fourth aspect, the preferred range of zirconium oxide (ZrO$_2$) is the platinum (Pt)-zirconium oxide (ZrO$_2$) alloy is from 0.05% to 5%; those of rhodium (Rh) and zirconium oxide (ZrO$_2$) in the platinum (Pt)-rhodium (Rh)-zirconium oxide (ZrO$_2$) alloy are from 5% to 80% and from 0.05% to 5%, respectively; those of rhodium (Rh) and thorium oxide (ThO$_2$) in the platinum (Pt)-rhodium (Rh)-thorium oxide (ThO$_2$) alloy are from 5% to 80% and from 0.05% to 5%, respectively; that of rhodium (Rh) in the gold (Au)-rhodium (Rh) alloy is from 5% to 80%; that of zirconium oxide (ZrO$_2$) in the gold (Au)-zirconium oxide (ZrO$_2$) alloy is from 0.05% to 5%; those of rhodium (Rh) and zirconium oxide (ZrO$_2$) is the gold (Au)-rhodium (Rh)-zirconium oxide (ZrO$_2$) alloy are from 5% to 80% and from 0.05% to 5%, respectively; and those of rhodium (Rh) and thorium oxide (ThO$_2$) in the gold (Au)-rhodium (Rh)-thorium oxide (ThO$_2$) alloy are from 5% to 80% and from 0.05% to 5%, respectively.

According to a fifth aspect of this invention, at least the opposing surfaces of the electrodes of the excimer laser device are covered with an etching resistive layer made of a platinum (Pt) based alloy consisting of the primary component platinum (Pt) and additive gold (Au), or a gold (Au) based alloy made of the primary component gold (Au) and additive platinum (Pt).

The alloys according to this aspect realize erosion-resistant long life electrodes by which the deterioration of the laser gas of the excimer laser device is reduced.

Figure 5:
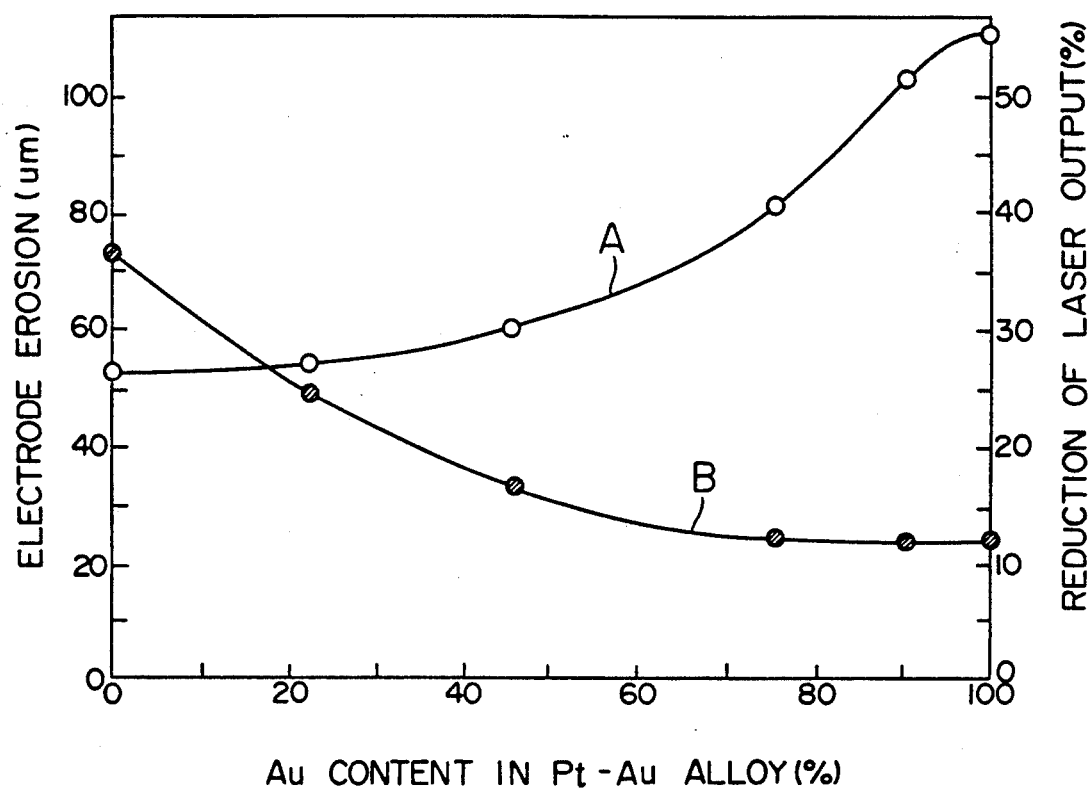
FIG. 5 is a diagram showing the amount of electrode erosion due to sputtering, etc., and the reduction of laser output due to gas deterioration in the long life tests in the case of the excimer laser device according to the fifth aspect of this invention.
Figure 6A:
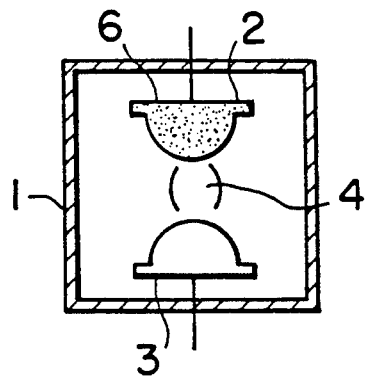
FIGS. 6(A-F) shows sections of embodiments of excimer laser devices according to the sixth aspect of this invention.
Figure 6B:
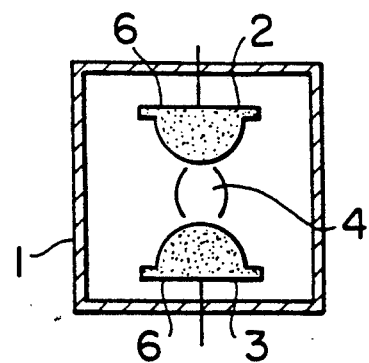
Figure 6C:
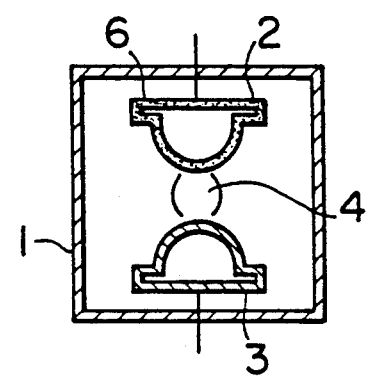
Figure 6D:
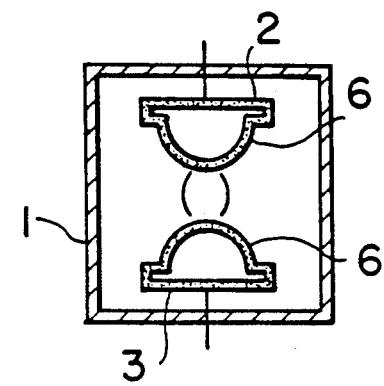
Figure 6E:
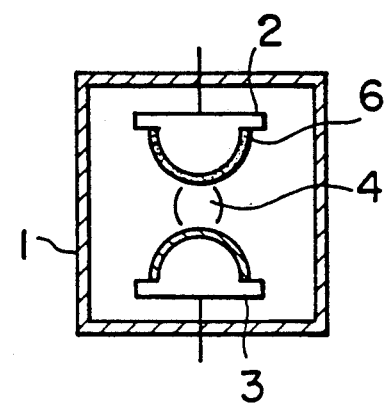
Figure 6F:
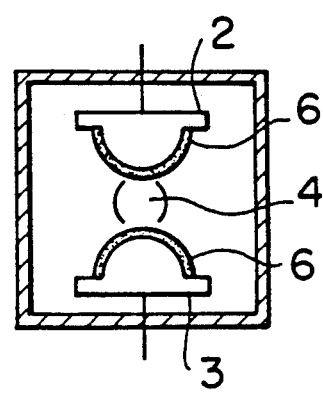

FIG. 5 is a diagram showing the amount of the electrode erosion due to sputtering, etc., and the reduction of laser output due to gas deterioration in the long life tests in the case of the excimer laser device according to the fifth aspect of this invention. The input power into the excimer laser device is 50 J/liter. The curve A shows the amount of electrode erosion. The curve B shows the reduction in the laser output power. The abscissa shows the gold (Au) content in the platinum (Pt)-gold (Au) alloy. The 0% on the abscissa corresponds to the pure platinum (Pt) electrode; the 100% corresponds to the pure gold (Au) electrode.

The platinum (Pt) electrode is superior to the gold (Au) electrode with respect to the electrode consumption, but is inferior with respect to the gas deterioration. On the other hand, the gold (Au) electrode is superior with respect to the gas life, but is inferior with respect to the electrode consumption.

As the content of gold (Au) increases, the amount of electrode consumption increases. This is deemed to be due to the lowering of the melting point of the alloy and the increase in the tendency to evaporation accompanying the increase of the gold (Au) content.

As is apparent from FIG. 5, the electrode consumption and the reduction in the laser output power exhibit non-linear characteristics with respect to the gold (Au) content. Thus, it is possible, by selecting an appropriate content of gold (Au) in the platinum (Pt)-gold (Au) alloy, firstly, to improve the electrode life by selecting a larger content of gold (Au) without substantially impairing the long gas life where the gas life is the primary concern, and secondly, to improve the gas life by selecting a smaller content of gold (Au) without substantially impairing the long life of the electrode where the reduction of the electrode consumption is the primary concern.

By the way, in the above description, only the electrodes have been covered with the platinum (Pt)-gold (Au) alloy. However, other parts of excimer laser device exposed to the laser gas may also be covered with the alloy.

According to the fifth aspect, the preferred content of gold (Au) in the platinum (Pt) based alloy (the alloy including platinum (Pt) as the primary component) is from 3% to 40%; that of platinum (Pt) in the gold (Au) based alloy is from 5% to 60%.

According to a sixth aspect of this invention, at least the opposing surface of one of the main electrodes of the excimer laser device is covered by an etching resistive alloy material consisting of a high-melting point metal as the primary component and an additive metal resistive to halogen gases.

Preferably, both the main electrodes or at least the cathode is covered by the etching resistive material. Thus, according to this aspect, the amount of consumption of the electrodes covered with the etching resistive material is effectively reduced. Further, it is preferred that the etching resistive material is made of an alloy consisting of: a high-melting point metal selected from the group consisting of rhodium (Rh), ruthenium (Ru), iridium (Ir), and osmium (Os); and a halogen resistive metal selected from the group consisting of platinum (Pt) and gold (Au).

FIG. 6 shows sections of embodiments of excimer laser devices according to the sixth aspect of this invention, wherein the views (A) through (F) show respective embodiments. In FIG. 6, the first main electrode 2 and the second main electrode 3 are housed within the laser box 1. The main discharge 4 is generated across the first main electrode 2 and the second main electrode 3. The electrodes shown with a dotted cross section are made of the alloy made of a high-melting point metal and a halogen-resistive metal 6. The high-melting point metal is selected from the group consisting of rhodium (Rh), ruthenium (Ru), iridium (Ir), or osmium (Os); the halogen resistive metal is selected from the group consisting of platinum (Pt) and gold (Au). The melting points of these elements are shown in the TABLE 1 below:

TABLE 1

| Metal | Melting point °C. |
| --- | --- |
| Rhodium (Rh) | 1960 |
| Ruthenium (Ru) | 2310 |
| Iridium (Ir) | 2443 |
| Osmium (Os) | 3050 |
| Platinum (Pt) | 1760 |
| Gold (Au) | 1063 |

Figure 7:
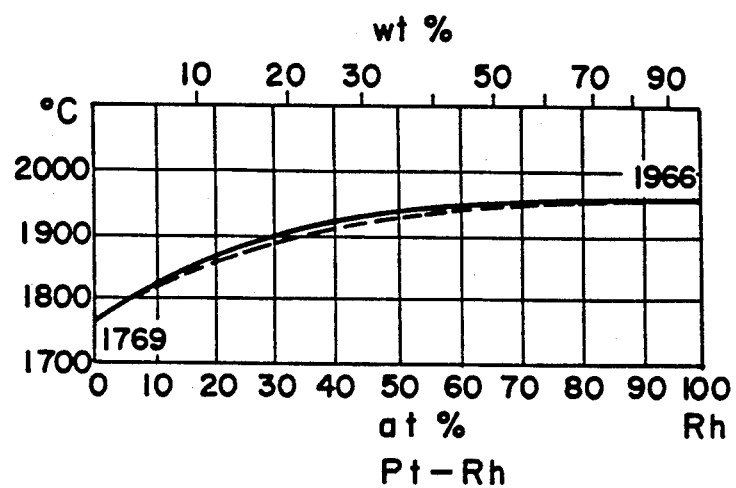
FIG. 7 shows the change of the melting point of an alloy (rhodium (Rh)-platinum (Pt) alloy) according to the sixth aspect of this invention, with respect to the content of rhodium (Rh) plotted along the abscissa.

FIG. 7 shows the change of the melting point of an alloy (rhodium (Rh)-platinum (Pt) alloy) according to the sixth aspect of this invention, with respect to the content of rhodium (Rh) plotted along the abscissa, wherein the solid curve is the liquidus curve by which the contents are represented for the liquid phase, while the dotted curve is the solidus curve by which the contents are represented for the solid phase alloy. The content of rhodium (Rh) is thus preferred to be 50% or more in the case of rhodium (Rh)-platinum (Pt) alloy.

In the case of the embodiment of FIG. 6 (A), the first main electrode 2 functioning as the cathode is made of the alloy made of a high-melting point metal and a halogen-resistive metal 6. The cathode is prone to erosion due to the localized temperature rise on the electrode caused by the generation of cathode spots via the impacts of the cations of the rare gas or the buffer gas. Thus, the first main electrode 2 is made of an alloy consisting of: 50% or more of a high melting point metal, which is itself halogen resistant, selected from the group consisting of rhodium (Rh), ruthenium (Ru), iridium (Ir), or osmium (Os); and an addition of highly halogen resistant platinum (Pt) or gold (Au). Thus, the first main electrode 2 is made of an alloy which has a high-melting point and is resistive to halogen gases.

The second main electrode 3 of FIG. 6 (A) is made of platinum (Pt) or gold (Au). The reason for the utilization of platinum (Pt) or gold (Au) is that the second main electrode 3 functioning as the anode undergoes electrode consumption which is caused not only by the impacts of the anions of the rare gas or the buffer gas but also by the chemical reactions with the halogen ions.

However, as shown in FIG. 6 (B), the second main electrode 3 may also be made of the alloy made of a high-melting point metal and a halogen-resistive metal 6. In such case, the composition of the first main electrode 2 serving as the cathode and the composition of the second main electrode 3 serving as the anode may be different from each other.

According to the sixth aspect of this invention, the consumption of the two main electrodes is minimized, and the instability of the discharge and the reduction of the laser output power due to the electrode deformation are substantially suppressed. Further, the life of the laser gas is prolonged, and the reliability of the excimer laser device is improved.

According to the embodiments shown in FIG. 6 (C) through (F), respectively, the surface of the electrodes or portions thereof are covered by the alloy made of a high-melting point metal and a halogen-resistive metal 6, thereby improving the life of the electrodes more economically. According to the embodiment of (C), the surface of the first main electrode 2 is covered by the alloy made of a high-melting point metal and a halogen-resistive metal 6. According to the embodiment of (D), the surface of both the first main electrode 2 and the second main electrode 3 are covered by the alloy made of a high-melting point metal and a halogen-resistive metal 6. According to the embodiment of (E), only the opposing surface portion of the first main electrode 2 is covered by the alloy made of a high-melting point metal and a halogen-resistive metal 6. According to the embodiment of (F), the opposing surface portions of both the first main electrode 2 and the second main electrode 3 are covered by the alloy made of a high-melting point metal and a halogen-resistive metal 6.

According to the sixth aspect, where platinum (Pt) is the additive element, the preferred content of the rhodium (Rh) is from 5% to 80%, that of ruthenium (Ru) is from 5% to 80%, that of iridium (Ir) is from 5% to 80%, and that of osmium (Os) is from 5% to 80%.

Where gold (Au) is the additive element, the preferred content of the rhodium (Rh) is from 5% to 80%, that of ruthenium (Ru) is from 5% to 80%, that of iridium (Ir) is from 5% to 80%, and that of osmium (Os) is from 5% to 80%.

According to a seventh aspect of this invention, at least the opposing surface of one of the main electrodes is covered with an etching resistive material made of a metal based material consisting of: a primary component metal having a low reactivity with respect to halogen gases; and an additive oxide or compound or mixture of oxide and compound having a work function not exceeding 4 eV.

The addition of the oxide or compound or mixture thereof facilitates the emission of electrons from the electrodes. Thus, the generation of the cathode spots is suppressed, and hence the localized overheating of the cathode electrode can be prevented.

Figure 8:
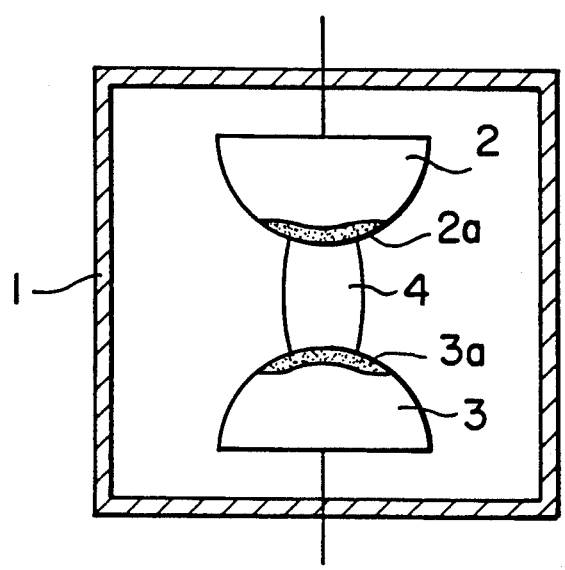
FIG. 8 shows a section of an excimer laser device according to the seventh aspect of this invention.

FIG. 8 shows a section of an excimer laser device according to the seventh aspect of this invention. The opposing surface portion 2a of the first main electrode 2 and the opposing surface portion 3a of the second main electrode 3 are covered with an etching resistive material consisting of primary component balance nickel (Ni) and an addition of 2% yttrium oxide ($Y_2O_3$). These layers 2a and 3a are coated on the respective nickel (Ni) base of the first main electrode 2 and the second main electrode 3.

Figure 34:
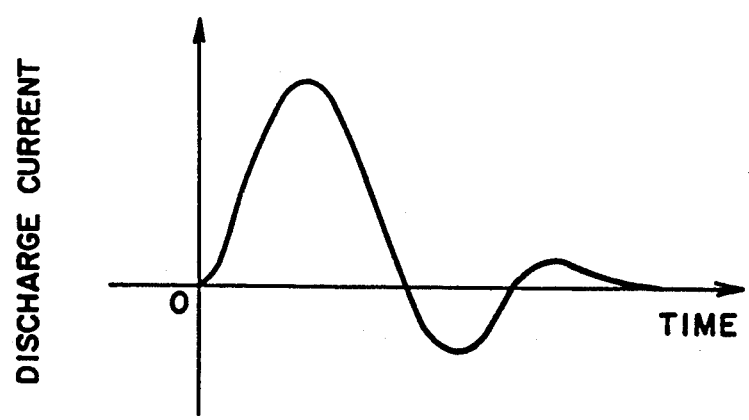
FIG. 34 shows the variation of the discharge current of excimer laser.

The work function of yttrium oxide ($Y_2O_3$) is 2.0 eV. Thus, the addition of yttrium oxide ($Y_2O_3$) to nickel (Ni) increases the current supplying (or electron emitting) capacity of the electrodes, and thereby suppresses the generation of the cathode spots thereon. As a result, the electrode life is prolonged from $3 \times 10^8$ shots to $1 \times 10^9$ shots. Further, the gas life is not reduced by the addition of yttrium oxide ($Y_2O_3$). As pointed out above in the introductory portion of this specification by reference to FIG. 34, the direction of the discharge current of the excimer laser device is inverted for a short time after the excimer laser operation begins. Thus, although the cathode spots are generated primarily on the first main electrode 2 functioning primarily as the cathode of the excimer laser device, a small number of cathode spots are also generated on the second main electrode 3. The addition of yttrium oxide ($Y_2O_3$) on the opposing surface portion 2a of the first main electrode 2 remarkably reduces the consumption thereof. Although reduction of the electrode consumption by means of the addition of yttrium oxide ($Y_2O_3$) on the opposing surface portion 3a of the second main electrode 3 is less conspicuous, it amounts to 30% reduction of consumption.

In the above embodiment of the seventh aspect, the primary component of the material of the opposing surface portions 2a and 3a of the electrodes is nickel (Ni). However, it may be any metal material having a low reactivity to the halogen gases, such as: gold (Au), platinum (Pt), rhodium (Rh), ruthenium (Ru), iridium (Ir), palladium (Pd), or osmium (Os); or an alloy of nickel (Ni) and one or more of these elements. The consumption of the electrodes can be further reduced by the usage of these elements. Since the materials containing these elements are expensive, they are preferably used only on the opposing surface portions 2a and 3a of the main electrodes.

Further, according to the above embodiment, the additive material of the surface portions 2a and 3a is yttrium oxide ($Y_2O_3$). However, the additive material may be any oxide or compound or mixture thereof having a work function not exceeding 4.0 eV. Such additive materials include: zirconium oxide ($ZrO_2$), cerium oxide ($CeO_2$, $Ce_2O_3$), thorium oxide ($ThO_2$), lanthanum oxide ($La_2O_3$), barium oxide (BaO), strontium oxide (SrO), cesium oxide ($Cs_2O$), calcium oxide (CaO), and lanthanum hexaboride ($LaB_6$), as well as yttrium oxide ($Y_2O_3$), and a mixture of these oxides or compound. Among these, the materials which have low reactivity with respect to the halogen gases include: yttrium oxide ($Y_2O_3$), zirconium oxide ($ZrO_2$), cerium oxide ($CeO_2$, $Ce_2O_3$), thorium oxide ($ThO_2$), lanthanum oxide ($La_2O_3$), and barium oxide (BaO).

According to an eighth aspect of this invention, at least the surface portion of the anode opposing the cathode is made of metal or alloy having a low reactivity with respect to halogen gases, and at least the surface portion of the cathode opposing the anode is made either of a high-melting point metal or alloy material or of a material which easily emits electrons.

The metal or alloy materials having low reactivity with respect to halogen gases include: gold (Au), platinum (Pt), rhodium (Rh), ruthenium (Ru), iridium (Ir), palladium (Pd), osmium (Os), and an alloy consisting of one or more of these elements. Alternatively, the metal or alloy material having a low reactivity with respect to halogen gases may be a nickel (Ni) based (balance Ni) alloy consisting of: balance nickel (Ni) as the primary component; and one or more elements selected from the group consisting of: gold (Au), platinum (Pt), rhodium (Rh), ruthenium (Ru), iridium (Ir), palladium (Pd), and osmium (Os).

Still alternatively, the metal or alloy material having low reactivity with respect to halogen gases may be either an alloy of platinum (Pt), rhodium (Rh), and zirconium oxide ($ZrO_2$), or an alloy of platinum (Pt), rhodium (Rh), and thorium oxide ($ThO_2$).

On the other hand, the high melting point alloy may consist of platinum (Pt) and one or more elements selected from the group consisting of rhodium (Rh), ruthenium (Ru), iridium (Ir), and osmium (Os). Alternatively, the high-melting point metal or alloy material may be: a metal selected from the group consisting of rhodium (Rh), ruthenium (Ru), iridium (Ir), and osmium (Os); or an alloy consisting of a primary element selected from the same group and one or more additive elements selected from the same group.

The material which easily emits electrons may consist of: nickel (Ni) or a metal having low reactivity with respect to halogen gases, as a primary component; and an additive consisting of one or more oxides or compounds which have a work function not exceeding 4 eV.

Figure 9:
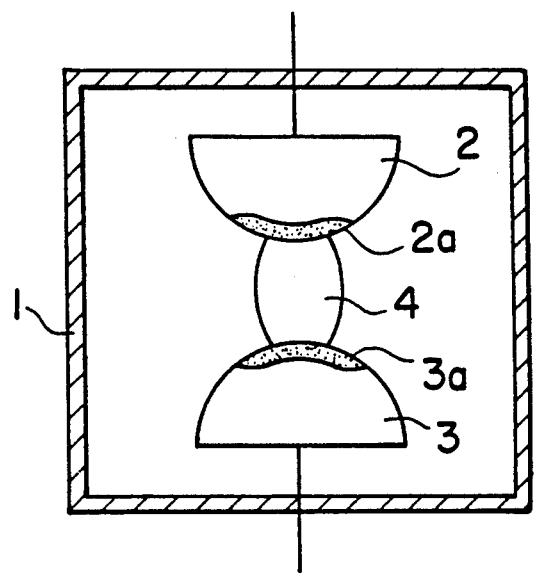
FIG. 9 shows a section of an excimer laser device according to the eighth aspect of this invention.

FIG. 9 shows a section of an excimer laser device according to the eighth aspect of this invention. The opposing surface portion 2a of the first main electrode 2, functioning as the cathode surface, opposes the opposing surface portion 3a of the second main electrode 3, functioning as the anode surface. The base material of the first main electrode 2 is made of nickel (Ni). On the opposing surface portion 2a exposed to the discharge is attached a layer 200 μm thick, which consists of nickel (Ni) and an addition of yttrium oxide ($Y_2O_3$). The attachment of the layer on the opposing surface portion 2a of the first main electrode 2 is enhanced via an electron beam scanning process. The base of the second main electrode 3 is also made of nickel (Ni). On the opposing surface portion 3a exposed to the discharge is attached a foil 200 μm thick made of an alloy of platinum (Pt) and iridium (Ir) (containing 50% iridium (Ir)). The attachment of the foil on the opposing surface portion 3a is enhanced by electron beam scanning.

Since the opposing surface portion 2a on the cathode is covered with an alloy containing yttrium oxide ($Y_2O_3$) having a work function of 2.0 eV according to this embodiment, the current supply capacity of the opposing surface portion 2a on the first main electrode 2 is increased. Thus, the generation of cathode spots on the first main electrode 2 is suppressed. As a result, without utilizing expensive material such as platinum (Pt), the consumption of the first main electrode 2 due to the discharge can be reduced by 10% compared to the case of a pure nickel (Ni) electrode.

Further, since the opposing surface portion 3a on the anode is covered with an alloy of platinum (Pt) and iridium (Ir) which has low reactivity with respect to halogen anions, the consumption of the anode due to the discharge can be reduced by 12% compared to the case of the pure nickel (Ni) electrode. Since relatively inexpensive iridium (Ir) is mixed with platinum (Pt), the cost can be reduced, with the advantage of reducing the amount of electrode consumption.

In the above embodiment, the opposing surface portion 3a on the anode 3 is covered with a platinum (Pt)-iridium (Ir) alloy. However, the opposing surface portion 3a may be covered by any metal or alloy having a low reactivity with respect to the halogen gases, such as: gold (Au), platinum (Pt), rhodium (Rh), ruthenium (Ru), iridium (Ir), palladium (Pd), or osmium (Os), or an alloy of two or more of these elements.

Further, the opposing surface portion 3a may be covered by a nickel (Ni) based alloy consisting of: nickel (Ni) as the primary component, and one or more additive elements selected from the group consisting of gold (Au), platinum (Pt), rhodium (Rh), ruthenium (Ru), iridium (Ir), palladium (Pd), and osmium (Os). Although the utilization of the nickel (Ni) based alloy increases slightly the amount of electrode consumption compared to the case of the platinum (Pt)-iridium (Ir) alloy without a nickel (Ni) component, the cost of the material can be substantially reduced and the cost performance is thus improved. Furthermore, the electrode life is prolonged compared to the case of a pure nickel (Ni) electrode.

Figure 33:
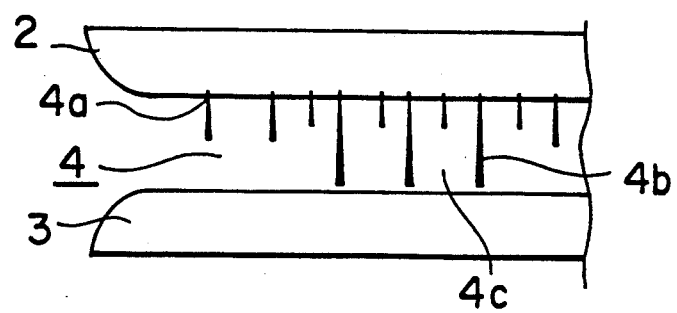
FIG. 33 is a schematic enlarged side view of the main discharge generated across the electrodes.

The opposing surface portion 3a on the second main electrode 3 may also be covered by an alloy of platinum (Pt)-rhodium (Rh)-zirconium oxide ($ZrO_2$), or an alloy of platinum (Pt)-rhodium (Rh)-thorium oxide ($ThO_2$). These alloys has low reactivity with respect to the halogen gases and exhibit high mechanical strength. Thus, in the case where the streamers 4b are generated as shown in FIG. 33 and electrode consumption due to the sputtering, etc., is conspicuous, these alloys reduce the electrode consumption compared to the case of the platinum (Pt)-rhodium (Rh) alloy.

Further, according to the above embodiment, the additive material of the surface portions 2a and 3a is yttrium oxide ($Y_2O_3$). However, the additive material may be any oxide or compound or mixture thereof having a work function not exceeding 4.0 ev. Such additive material includes: zirconium oxide ($ZrO_2$), cerium oxide ($CeO_2$, $Ce_2O_3$), thorium oxide ($ThO_2$), lanthanum oxide ($La_2O_3$), barium oxide (BaO), strontium oxide (SrO), cesium oxide ($Cs_2O$), calcium oxide (CaO), and lanthanum hexaboride ($LaB_6$), as well as yttrium oxide ($Y_2O_3$), and a mixture of these oxides or compound. Among these, the materials which have a low reactivity with respect to the halogen gases include: yttrium oxide ($Y_2O_3$), zirconium oxide ($ZrO_2$), cerium oxide ($CeO_2$, $Ce_2O_3$), thorium oxide ($ThO_2$), lanthanum oxide ($La_2O_3$), and barium oxide (BaO).

Further, in the above embodiment, the layer on the opposing surface portion 2a includes nickel (Ni) as the primary component. If a metal or an alloy having low reactivity with respect to the halogen gases as specified above is utilized for the layer on the opposing surface portion 2a, the electrode life can be further prolonged.

In the above embodiment, the opposing surface portion 2a on the first main electrode 2 is covered by a material which easily emits electrons. However, the same advantage can be obtained by covering the opposing surface portion 2a with a high melting point alloy consisting of: platinum (Pt) and one or more elements selected from the group consisting of rhodium (Rd), ruthenium (Ru), iridium (Ir), and osmium (Os). The alloy has a higher melting point than pure platinum (Pt). Thus, even when the cathode spots 4a are generated, the electrode material does not undergo evaporation and the consumption of the electrode is reduced. Alternatively, the high melting point material covering the opposing surface portion 2a may consist of rhodium (Rh), ruthenium (Ru), iridium (Ir), or osmium (Os); or of an alloy consisting of: one of these elements as the primary component, and one or more additive elements selected from these elements. These metals or alloys have a higher melting point than the alloys containing platinum (Pt). Thus, the amount of consumption of the electrode can be further reduced. (see TABLE 1 above.)

By the way, in the above embodiment, only the opposing surface portion 3a on the anode opposing the first main electrode 2 is covered with a metal having a low reactivity with respect to the halogen gases. However, when accompanied by the advantage of cost reduction, the whole surface of the second main electrode 3 may be covered with a metal having a low reactivity with respect to halogen gases. Alternatively, the whole of the second main electrode 3 may be made of a metal having low reactivity with respect to halogen gases. Similarly, the whole surface or the whole body of the first main electrode 2 may be made of the same material as the opposing surface portion 2a thereon.

According to a ninth aspect of this invention, at least the anode of the excimer laser device is covered with a platinum, (Pt) layer not less than 20 μm thick.

Thus, the electrode consumption is reduced and the electrode life is prolonged without increasing the cost too much, thereby realizing a excimer laser device of high-reliability.

Figure 10:
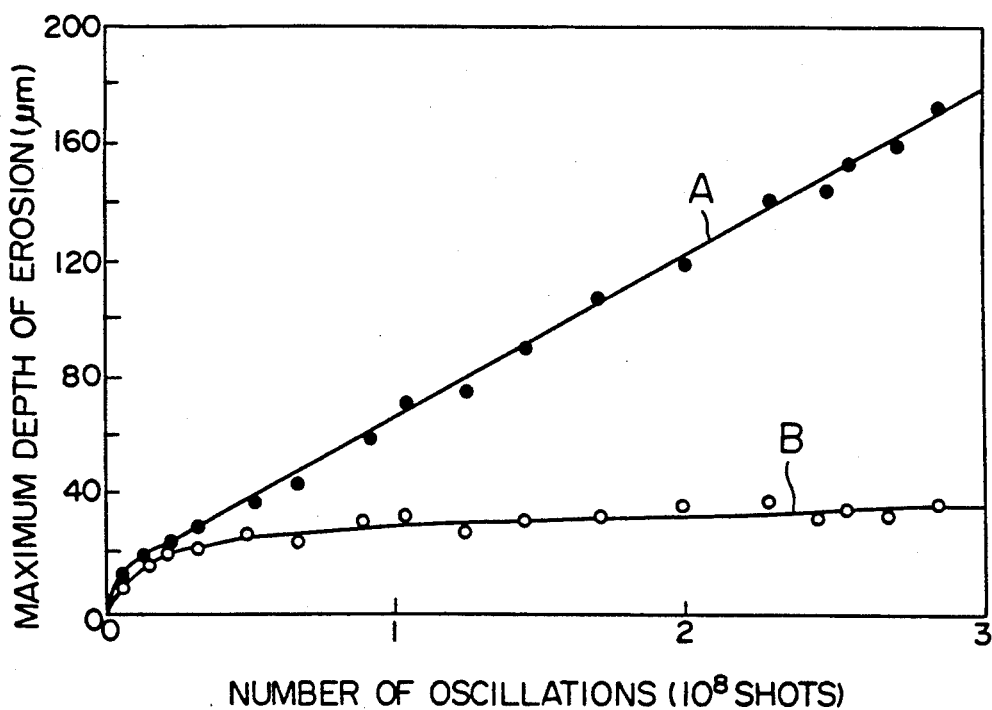
FIG. 10 is a diagram showing the electrode deformation (depth of erosion) due to sputtering, etc., in the long life test of an excimer laser device according to the ninth aspect of this invention.

FIG. 10 is a diagram showing the electrode deformation (depth of erosion) due to sputtering, etc., in the long life test of an excimer laser device according to the ninth aspect of this invention. The input power supplied to the excimer laser device is 50 J/liter. The curve A shows the case for the conventional nickel (Ni) electrode; the curve B shows the electrode covered with a platinum (Pt) layer of about 200 μm according to the ninth aspect.

As seen from FIG. 10, the conventional nickel (Ni) electrode (curve A) is eroded in the direction of depth by about 180 μm after $3 \times 10^8$ shots. On the other hand, the electrode covered with a platinum (Pt) layer (curve B) is eroded only about 40 μm after $3 \times 10^8$ shots.

Figure 11:
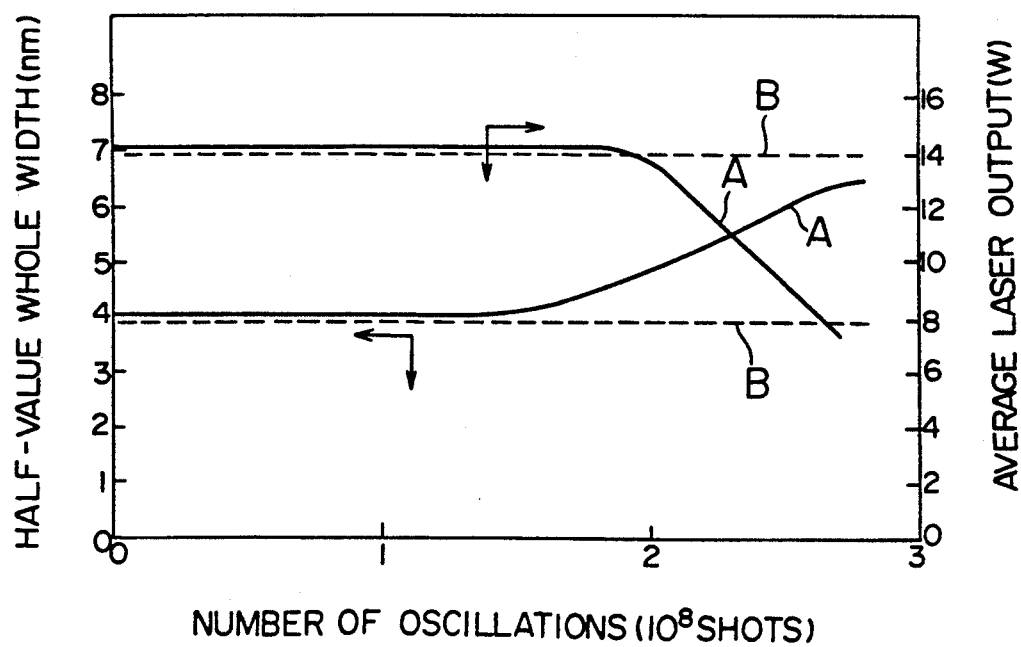
FIG. 11 is a diagram showing the laser beam band pattern (half-value width) changes and the laser output changes accompanying the electrode deformation (erosion), wherein the solid curves A show the case of nickel (Ni) electrode and the dotted curves B show the case of electrode covered with platinum (Pt) according to the ninth aspect of this invention.

FIG. 11 is a diagram showing the laser bean band pattern (half-value width) changes and the laser output changes accompanying the electrode deformation (erosion), wherein the solid curves A show the case of nickel (Ni), electrodes and the dotted curves B show the case of electrodes covered with platinum (Pt) according to the ninth aspect of this invention. In the case of the nickel (Ni) electrodes (curve A), the beam band pattern change (the half-value width increase) and the laser output reduction become conspicuous after a prolonged operation. However, in the case of the platinum (Pt) covered electrodes (curve B), the beam band pattern and the laser output level remain substantially unchanged. The effectiveness of the platinum (Pt) layer according to the ninth aspect is thus apparent. Incidentally, the curves B are displaced vertically in the figure to distinguish them from the overlapping portions of the curves A.

The reason for the numerical limitation of the platinum (Pt) layer thickness according to the ninth aspect is as follows.

Until the depth of the erosion reaches 20 μm, the progress of erosion is more rapid than thereafter. Thus, at this stage, the depth of erosion of platinum (Pt) covered electrodes B is not much smaller than the depth of erosion of the nickel (Ni) electrodes A. On the other hand, the progress of erosion after 20 μm for the nickel (Ni) electrodes A and platinum (Pt) covered electrodes B is markedly differentiated. This turning point in the progress of erosion may vary with the geometric form of the electrode of the input power, but falls within the range of from about 20 μm to 40 μm.

The reason therefor is considered to be as follows. The design of electrodes is done under the assumption that the electrodes are in a perfectly uniform electric field. However, the actual discharge within the excimer laser divice is not perfectly uniform. Thus, during the initial period after the beginning of discharge, the discharge is somewhat concentrated to those portions where the electric field is stronger. The portions of the electrodes corresponding thereto are eroded first. Thus, during this initial stage in which the depth of erosion is smaller than the turning point depth at 20 μm, the electrodes are eroded into forms corresponding to the actual distribution of the electric field. Thereafter, the progress of the deformation of the electrodes become slower.

Thus, it is apparent that since the platinum (Pt) layer the thickness of which is less than 20 μm is eroded away from the electrodes during the initial stage of operation, the effectiveness of such layer is small. For the purpose of preventing the electrode consumption, a platinum (Pt) layer at least 20 μm thick must be disposed on the electrodes.

Further, as seen from FIG. 11, the reduction of the laser output for the nickel (Ni) electrode (decreasing curve A) is accelerated after the number of oscillations reaches $2 \times 10^8$ shots, which correspond to the depth of electrode erosion of 120 μm in FIG. 10. This acceleration of laser output results from the instability of the discharge occasioned by the electrode deformation. The platinum (Pt) covered electrodes may undergo the same acceleration if the depth of erosion of the electrode exceeds 120 μm. Thus, it is preferred that the thickness of the platinum (Pt) layer is 120 μm or more.

On the other hand, if the thickness of the platinum (Pt) layer exceeds 1 mm, the platinum (Pt) layer alone has a sufficient mechanical strength to serve as an electrode. Thus, no advantage results form increasing the thickness of the platinum (Pt) layer above 1 mm.

In the above embodiment, both the first main electrode 2 and the second main electrode 3 are provided with a platinum (Pt) layer. However, the platinum (Pt) layer is particularly effective at the anode side, and substantially the same advantage as above can be obtained by disposing the platinum (Pt) layer only on the anode.

According to a tenth aspect of this innvention, only the surface portions of the main electrodes opposing the other electrode, or only the surface portion of the anode opposing the cathode are covered with a platinum (Pt) or gold (Au) layer.

Thus, long life electrodes with smaller electrode consumption can be realized without wasting expensive platinum (Pt) or gold (Au). As a result, the excimer laser device of high reliability can be realized.

Figure 12:
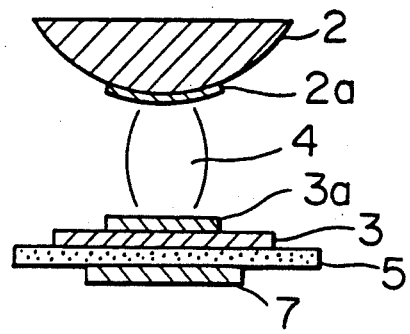
FIG. 12 is a sectional view showing the main electrode portion (discharge region) of the excimer laser device according to the tenth aspect of this invention.

FIG. 12 is a sectional view showing the main electrode portion (discharge region) of the excimer laser device according to the tenth aspect of this invention. Only the opposing surface portion 2a of the first main electrode 2 which opposes the second main electrode 3 and is exposed to the discharge region 4 is covered with a platinum (Pt) layer. Similarly, only the opposing surface portion 3a of the second main electrode 3 which opposes the first main electrode 2 is covered with a platinum (Pt) layer. The second main electrode 3 is disposed on a dielectric plate 5, on the lower surface of which is attached an auxiliary electrode 7.

Figure 13:
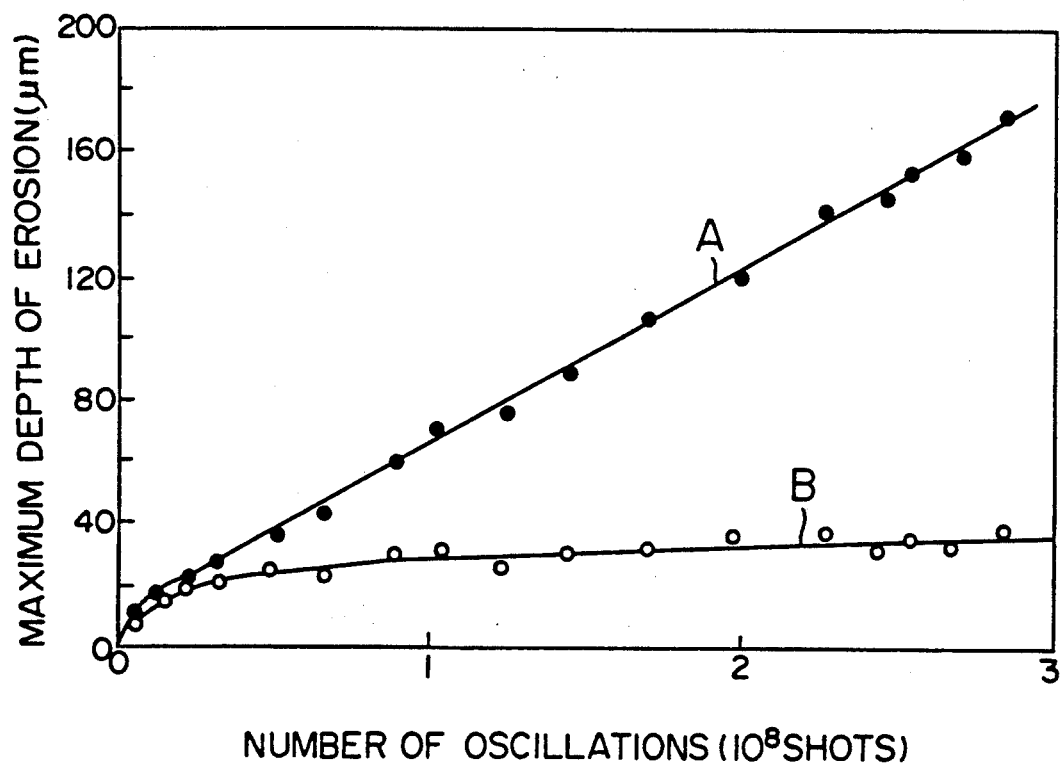
FIG. 13 is a diagram showing the electrode deformation (depth of erosion) due to sputtering, etc., of the excimer laser device of FIG. 12 according to the tenth aspect in the long life test.

FIG. 13 is a diagram showing the electrode deformation (depth of erosion) due to sputtering, etc., of the excimer laser device of FIG. 12 according to the tenth aspect in the long life test. The laser box has been filled with a laser medium made of krypton (Kr) as the rare gas component and fluorine (F) as the halogen gas component, which is diluted with neon (Ne) buffer gas. The input power is 50 J/liter. The curve A shows the case for the conventional nickel (Ni) electrode; the curve B shows the case for electrodes only the opposing surfaces of which are covered with a platinum (Pt) layer about 80 μm thick according to the tenth aspect. The depth of erosion of electrodes is plotted along the ordinate in μm; the number of oscillations is plotted along the abscissa in the unit of $10^8$ shots.

As seen from FIG. 13, the erosion of the nickel (Ni) electrode proceeds to a depth of about 180 μm after $3 \times 10^8$ shots. On the other hand, the erosion of the electrode provided with a platinum (Pt) layer proceeds only to a depth of about 40 μm after $3 \times 10^8$ shots.

Figure 14:
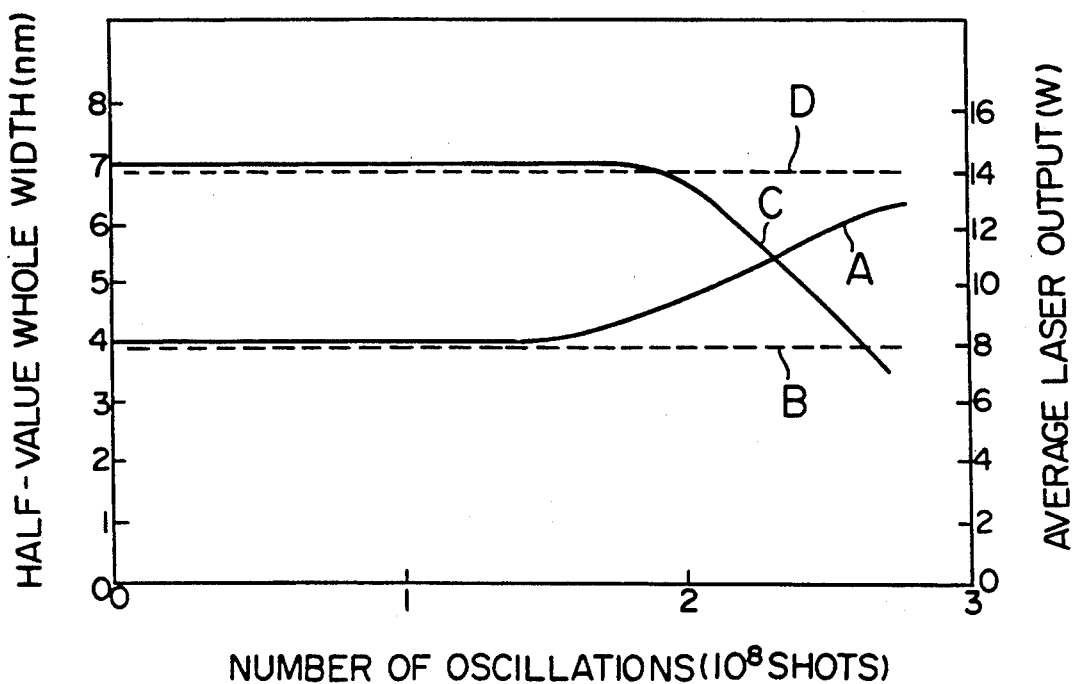
FIG. 14 is a diagram showing the laser beam band pattern changes (half-value width changes) and the laser output power changes accompanying the electrode deformation (erosion), wherein the solid curves A and C show the band pattern change and the laser output power change, respectively, of nickel (Ni) electrode, and the dotted curves B and D show the band pattern change and the laser output power change, respectively, of nickel (Ni) electrode covered with platinum (Pt) according to the tenth aspect of this invention.

FIG. 14 is a diagram showing the laser beam band pattern changes (half-value width changes) and the laser output power changes accompanying the electrode deformation (erosion), wherein the solid curves A and C show the band pattern change and the laser output power change, respectively, of nickel (Ni) electrode, and the dotted curves B and D show the band pattern change and the laser output power change, respectively, of nickel (Ni) electrode covered with platinum (Pt) according to the tenth aspect of this invention. The half-value whole width (nm) of the laser beam and the average laser output power (W) are plotted along the ordinate. The number of oscillations (in $10^8$ shots) are plotted along the abscissa. In the case of the nickel (Ni) electrode, the beam band pattern change and the reduction of the laser output are conspicuous. On the other hand, in the case of the electrodes provided with a platinum (Pt) layer, the beam band pattern change and the laser output power reduction are negligibly small. The effectiveness of the platinum (Pt) layer according to this aspect is thus apparent.

From this result, it is known that the primary factor contributing to the consumption of electrodes is not the sputtering caused via ions and electrons impinging on the electrodes as has hitherto been suggested, but the reactions with the halogen gas.

By the way, the consumption of the anode proceeds more rapidly than that of the cathode. Thus, the fluorine (F) anions are deemed to contribute substantially to the consumption of electrodes. Consequently, only the opposing surface portion on the anode may be covered with a platinum (Pt) or gold (Au) layer, thereby obtaining the advantage of prolonging the electrode life as above.

According to an eleventh aspect of this invention, at least one of the main electrodes has a form of a hollow cylinder or a portion of a hollow cylinder made of: platinum (Pt), gold (Au), or a platinum (Pt) or gold (Au) based alloy including platinum (Pt) or gold (Au) as the primary component. According to this aspect, the life of the main electrodes can be prolonged without increasing the cost inordinately.

FIGS. 15 through 19 shows the various embodiments of the eleventh aspect.

Figure 15:
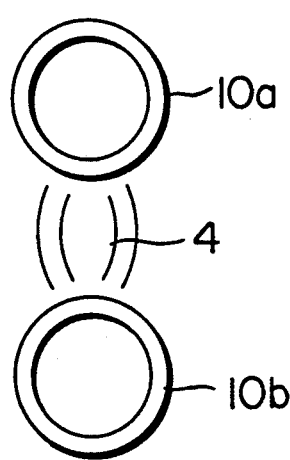
FIG. 15 is a sectional view of the main electrodes of a first embodiment according to the eleventh aspect of this invention, wherein the electrodes are each made of a hollow cylinder.

FIG. 15 is a sectional view of the main electrodes of a first embodiment according to the eleventh aspect of this invention, wherein the electrodes are each made of a hollow cylinder. The first main electrode and the second main electrode are constituted by a first hollow cylinder electrode 10a and a second hollow cylinder electrode 10b, respectively, the axes of which extend at right angles to the sheet of the drawing. The main discharge 4 is generated across the outer side surfaces of the first hollow cylinder electrode 10a and the second hollow cylinder electrode 10b.

Figure 16:
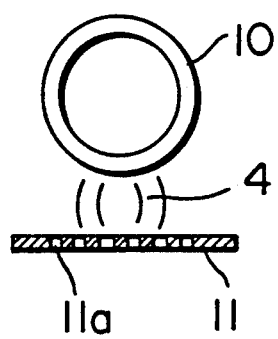
FIG. 16 is a sectional view of the main electrodes of a second embodiment according to the eleventh aspect of this invention, wherein one of the electrodes is made of a hollow cylinder.

FIG. 16 is a sectional view of the main electrodes of a second embodiment according to the eleventh aspect of this invention, wherein one of the electrodes is made of a hollow cylinder. Only the first main electrode is made of a hollow cylinder electrode 10. The second main electrode is made of a perforated plate electrode 11, through the thickness of which a plurality of openings 11a are formed in the region where the main discharge 4 is generated.

Figure 17:
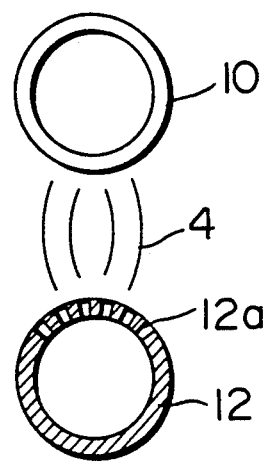
FIG. 17 is a sectional view of the main electrodes of a third embodiment according to the eleventh aspect of this invention, wherein the electrodes are each made of a hollow cylinder, one of electrodes being provided with openings.

FIG. 17 is a sectional view of the main electrodes of a third embodiment according to the eleventh aspect of this invention, wherein the electrodes are each made of a hollow cylinder, one of electrodes being provided with openings. The first main electrode is made of a hollow cylinder electrode 10; the second main electrode is made of a perforated hollow cylinder electrode 12, through which a plurality of radially extending openings 12a are formed in the region where the main discharge 4 is formed.

Figure 18:
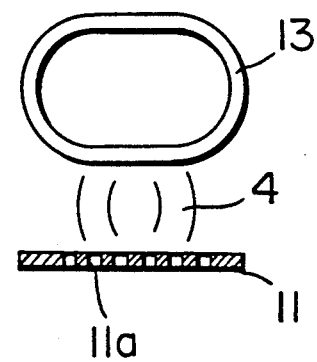
FIG. 18 is a sectional view of the main electrodes of a fourth embodiment according to the eleventh aspect of this invention, where one of the electrodes is made of a hollow cylinder of elliptical cross section.

FIG. 18 is a sectional view of the main electrodes of a fourth embodiment according to the eleventh aspect of this invention, where one of the electrodes is made of a hollow cylinder of elliptical cross section. The first main electrode is made of an elliptical hollow cylinder electrode 13 having an elliptical cross section. The second main electrode is made of a perforated plate electrode 11, through the thickness of which a plurality of openings 11a are formed where the main discharge 4 is formed.

Figure 19:
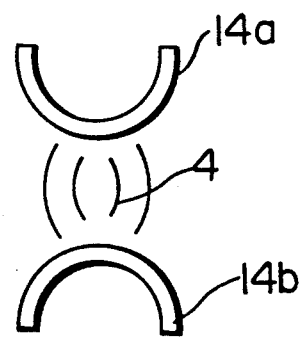
FIG. 19 is a sectional view of the main electrodes of a fifth embodiment according to the eleventh aspect of this invention, where the electrodes are each made of an axially divided half portion of a hollow cylinder.

FIG. 19 is a sectional view of the main electrodes of a fifth embodiment according to the eleventh aspect of this invention, where the electrodes are each made of an axially divided half portion of a hollow cylinder. The first main electrode and the second main electrode are made of a first half cylinder electrode 14a and a second half cylinder electrode 14b, respectively. The first half cylinder electrode 14a and the second half cylinder electrode 14b are obtained by dividing a hollow half cylinder along the axial direction.

The hollow cylinder electrode 10, the first hollow cylinder electrode 10a and the second hollow cylinder electrode 10b, the perforated hollow cylinder electrode 12, the elliptical hollow cylinder electrode 13, and the first half cylinder electrode 14a and the second half cylinder electrode 14b are made of platinum (Pt) or gold (Au), or of a platinum (Pt) or gold (Au) based alloy.

The advantage of the electrodes according to the eleventh aspect is as follows.

From the view point of preventing the deterioration of the laser gas, the thickness of platinum (Pt) or gold (Au) or the platinum (Pt) or gold (Au) based alloy may be very small. However, in view of the sputtering caused by the discharge, a thickness of not less than 100 μm is preferred. On the other hand, thick electrodes are expensive. Thus, the thickness of electrodes should be under several millimeters, preferably under 1 mm.

However, platinum (Pt), gold (Au), and a platinum (Pt) or gold (Au) based alloy are soft and mechanically weak. Thus, if the thickness of electrodes having a conventional form is reduced under 1 mm, it becomes hard to maintain the form thereof. In the case of excimer laser devices, in particular, at least one of the electrodes generally has a structure, such as the Chang or the Rogowskii type structure, by means of which the strength of the electric field is gradually diminished from the axial center to the periphery for the purpose of realizing a uniform discharge across the electrodes. Thus, the difficulty of maintaining the form of the electrodes is greater compared with the case of the plate electrodes.

The whole or partial hollow cylindrical form of the electrodes according to this aspect increases the mechanical strength of the electrodes. Thus, it is possible to maintain the form of such electrodes having a thickness not greater than 1 mm.

The above embodiments relates to cases where the hollow cylinders have a circular or elliptical cross section. However, the electrodes may have any cross sectional form provided that the electrodes have forms of hollow cylinders or axially divided hollow cylinders.

According to a twelfth aspect of this invention, the main electrodes consists of a base material and a layer of an etching resistive material covering an outer surface of the base material, wherein the base material has a heat conductivity greater than that of the etching resistive material of the surface layer.

Figure 20:
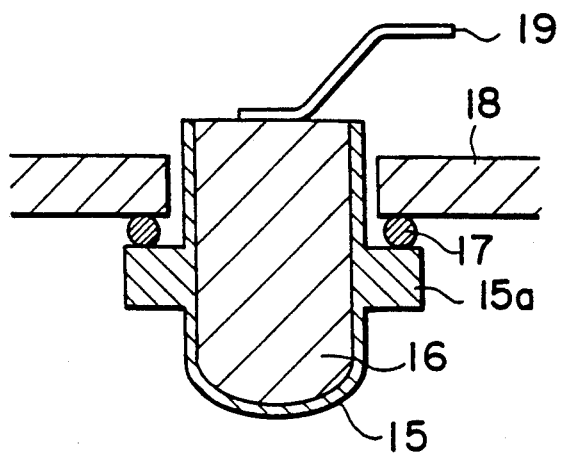
FIG. 20 is a sectional view showing an excimer laser device according to the twelfth aspect of this invention.

FIG. 20 is a sectional view showing an excimer laser device according to the twelfth aspect of this invention. A nickel surface layer 15 covers a base material 16 of the main electrode, which is made of a metal having a heat conductivity greater than that of nickel (Ni). An O-ring 17 is inserted between the laser box wall 18 and the flange 15a on the electrode for the purpose of sealing the electrode within the laser box. The laser box wall 18 is made of an electrically insulating material consisting of ceramic, such as aluminum oxide, or of an organic resin such as tetrafluoroethylene (TFE) produced under the trade mark Teflon by Du Pont de Nemours, E. I. & Company. A power supply plate 19 is attached to the main electrode to supply power thereto. In view of the fact that the excimer laser device is operated continuously for about two years without exchanging the main electrodes, the thickness of the nickel surface layer 15 must be equal to or greater than 200 μm.

The following TABLE 2 shows the physical characteristics of metals having a heat conductivity greater than that of nickel (Ni).

TABLE 2

|  | density (g/cm$^3$) | Melting point (°C.) | heat conductivity (W/cm · deg) |
| --- | --- | --- | --- |
| Nickel (Ni) | 8.5 | 1455 | 0.9 |
| Copper (Cu) | 8.9 | 1083 | 4.0 |
| Silver (Ag) | 10.5 | 960 | 4.18 |
| Aluminum (Al) | 2.7 | 660 | 2.38 |
| Zinc (Zn) | 7.1 | 419 | 1.2 |

Next, the method of producing the main electrodes according to the twelfth aspect is explained with reference to examples.

EXAMPLE 1

First, a cup-shaped nickel surface layer 15 at least 200 μm thick is formed by a press. Holding the nickel surface layer 15 to maintain the opening of the cup toward above, a molten base material 16 having a heat conductivity greater than that of nickel (Ni) and a melting point lower than that of nickel (Ni) is poured into the cup. For example, the base material 16 may be copper (Cu), silver (Ag), aluminum (Al), or zinc (Zn). Since the base material 16 has a melting point lower than that of nickel (Ni), the pouring of the base material 16 into the surface layer 15 does not cause mechanical failure of the nickel surface layer 15.

EXAMPLE 2

The base material 16 having a heat conductivity greater tha that of nickel (Ni) is machined by a cutting process. Thereafter, nickel (Ni) is coated at least 200 μm thick on the opposing surface portion of the main electrode to form the nickel surface layer 15 on the base material 16, thereby forming a main electrode of predetermined dimensions. The coating of nickel (Ni) can be done by the CVD (chemical vapor deposition) process under normal pressure or the liquid phase plating method.

The following TABLE 3 shows the amount of consumption of the electrode according to this aspect (A) and that of the conventional electrode (B):

TABLE 3

| CONSUMPTION OF MAIN ELECTRODE DISCHARGE CONDITION: OUTPUT POWER 5 W; 1 × 10$^8$ PULSES | | |
| --- | --- | --- |
|  | temperature rise (°C.) | amount of consumption (mg) |
| (A) | 30 | 150 |

TABLE 3-continued

| CONSUMPTION OF MAIN ELECTRODE DISCHARGE CONDITION: OUTPUT POWER 5 W; 1 × 10⁸ PULSES | |
|---|---|
| temperature rise (°C.) | amount of consumption (mg) |
| (B) 20 | 80 |

According to a thirteenth aspect of this invention, the opposing surface of each nickel (Ni) base portion of the main electrodes have a plurality of grooves formed thereon to render it rough, and a plate made of a metal selected from the group consisting of: platinum (Pt), rhodium (Rh), ruthenium (Ru), iridium (Ir), osmium (Os), or of an alloy consisting of two or more elements selected from the same group is attached to said opposing surface of the plate.

Since the opposing surface of the main electrode is rendered rough by means of the grooves, the plate is attached securely thereon. The plate on the opposing surface of the electrode thus does not develop micro-cracks, etc., and has a uniform section. Consequently, the discharge current can be supplied smoothly therethrough.

Figure 21A:
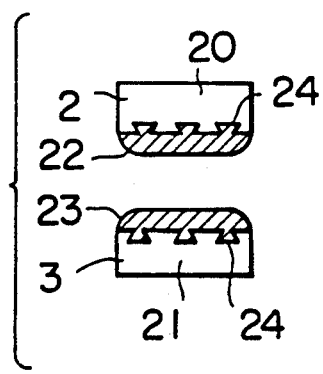
FIG. 21 shows sections of main electrodes according to the thirteenth aspect of this invention, wherein (A) and (B) show the crosswise and lengthwise sections thereof.
Figure 21B:
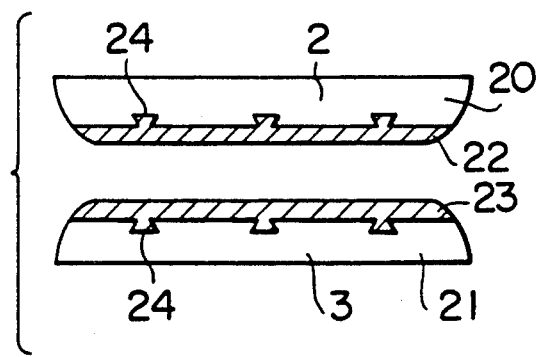

FIG. 21 shows sections of main electrodes according to the thirteenth aspect of this invention, wherein (A) and (B) show the crosswise and lengthwise sections thereof. FIG. 22 shows the plan view of the opposing surface of the nickel (Ni) base material of the main electrode (A), together with the various forms of the sections of the grooves formed on the nickel (Ni) base material of the main electrode (B) through (E). In FIG. 21, the first main electrode 2 and the second main electrode 3 opposing each other include a nickel (Ni) base material 20 and a nickel (Ni) base material 21, respectively, and a platinum (Pt) plate 22 and a platinum (Pt) plate 23 attached on the respective opposing surfaces of the electrodes. The nickel (Ni) base materials 20 and 21 have grooves 24 formed on the opposing surface thereof. The platinum (Pt) plate 22 and the platinum (Pt) plate 23 are pressed and adhered on the nickel (Ni) base material 20 and the nickel (Ni) base material 21, respectively, and are preferably heated thereafter to be welded thereto. The platinum (Pt) plates 22 and 23 thus penetrates into the grooves 24 to have a larger contact area with the nickel (Ni) base materials 20 and 21, respectively. Thus, the platinum (Pt) plates 22 and 23 are securely adhered to the nickel (Ni) base materials 20 and 21, respectively.

As shown in FIG. 22 (A), the grooves 24 may be formed in the form of rectangular mesh. As shown in FIGS. (B) through (E), the grooves 24 may have a cross sectional form of a trapezoid (B), a rectangle (C), a semicircle (D), or a triangle (F).

Since the platinum (Pt) plates 22 and 23 are attached securely to the nickel (Ni) base materials 20 and 21, respectively, the development of the micro-cracks on the main electrodes surfaces can be prevented.

According to a fourteenth aspect of this invention, the surfaces of the main electrodes are coated with platinum (Pt) or gold (Au), and at least a layer of a substrate material is interposed between the platinum (Pt) or gold (Au) coating and the base of the main electrodes.

According to this aspect, the adhesion of the platinum (Pt) or gold (Au) layer to the base material of the electrodes is enhanced via the substrate layer.

This aspect of the invention is based on the discovery that when electroplating of platinum (Pt) or gold (Au) is effected on nickel (Ni) under the condition where the standard electrode potential difference exceeds about 1 V, the adhesion of the resulting plated layer is prone to failures. Thus, for the purpose of obtaining a thick platinum (Pt) or gold (Au) layer securely electroplated nickel (Ni) base material under the condition of less than about 1 V standard potential difference, it is effective to interpose a substrate metal or alloy, such as palladium (Pd), which has a lower standard potential than platinum (Pt) or gold (Au).

FIG. 23 shows schematically the micrograph of platinum (Pt) plating according to the fourteenth aspect of this invention, taken by a metallurgical microscope. A platinum (Pt) electroplated coating 27 about 50 μm thick is formed on the nickel (Ni) base plate 25 via a nickel (Ni)-palladium (Pd) alloy interposed substrate 26. The platinum (Pt) electroplated coating 27 having no cracks and exhibiting enhanced adhesion to the nickel (Ni) base plate 25 can be obtained.

It is noted that two or more substrate layers 26 may be interposed between the nickel (Ni) base plate 25 and the platinum (Pt) electroplated coating 27. Further, the interposed layer 26 may be made of copper (Cu) which has a standard potential smaller than that of palladium (Pd). In the case where nickel (Ni)-palladium (Pd) alloy is used, nickel (Ni) is contained about 10%, such that the amount of occluded hydrogen is reduced. The interposed layer 26 may be made, for example, of a layer of copper (Cu) and another layer of nickel (Ni)-palladium (Pd) alloy superposed thereon. Then, a platinum (Pt) electroplated coating 27 more than 50 μm thick which if free from cracks and exhibits good adhesion to the nickel (Ni) base plate 25 can be obtained. Further, it is possible to use copper (Cu) base with a nickel (Ni)-platinum (Pt) alloy interposed layer. Furthermore, it is possible to use aluminum (Al) as the base plate and a copper (Cu) layer and a nickel (Ni)-palladium (Pd) alloy layer as a two-layered interposed substrate, thereby obtaining a light-weighted electrode. Further, inexpensive metals such as iron or steel may be used as the base material of the electrode.

According to a fifteen aspect of this invention, the surfaces of the main electrodes are coated with platinum (Pt), wherein a metal having a standard electrode potential difference of not greater than 1 V with respect to platinum (Pt) is coated on the base material of the main electrodes to serve as a substrate for the platinum (Pt) coating layer.

According to this aspect, when the platinum (Pt) is coated via the electroplating process, the substrate metal having a standard potential difference not greater than 1 V is not dissolved into the plating bath.

Figure 24:
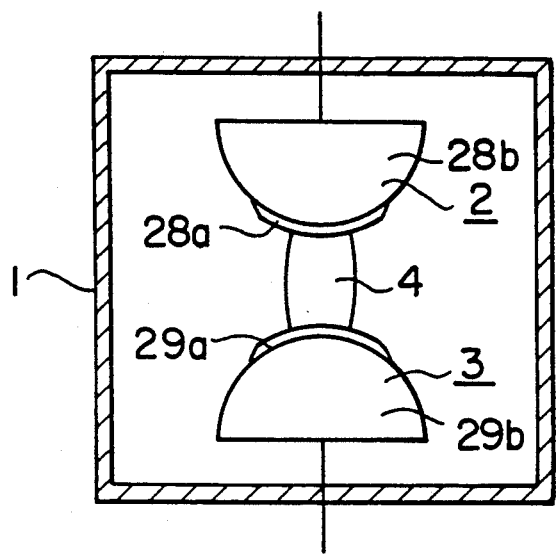
FIG. 24 is a sectional view of an excimer laser device according to the fifteenth aspect of this invention.

FIG. 24 is a sectional view of an excimer laser device according to the fifteenth aspect of this invention. The first main electrode 2 is covered with a substrate layer 28b such that the platinum (Pt) coating layer 28a is plated on the substrate layer 28b. Likewise, the second main electrode 3 is covered with a substrate layer 29b such that the platinum (Pt) coating layer 29a is plated on the substrate layer 29b. The substrate layers 28b and 29b made of copper (Cu) covers the base material of the electrodes. The standard electrode potential of platinum (Pt) is +1.2 V, and that of copper (Cu) is +0.34 V. Thus, the potential difference is 0.86 V, which is less than 1 V. The thickness of the platinum (Pt) coating layers 28a and 29a can be made as great as 30 μm with good adhesion. Problems such as the peeling off of the platinum (Pt) coating layer have not been observed.

When platinum (Pt) is plated as thick as 10 μm or more, a good plating can be obtained only if the standard electrode potential difference of platinum (Pt) and the substrate metal is within 1.0 V, since the substrate metal does not dissolve into the plating bath. The substrate metal may be selected from: gold (Au), silver (Ag), copper (Cu), or the platinum metals (i.e., ruthenium (Ru), rhodium (Rh), palladium (Pd), osmium (Os), and iridium (Ir)). It has been found that the thickness of the platinum (Pt) plating layer can be increased without failures by reducing the standard electrode potential difference between the substrate metal and platinum (Pt).

If the substrate metal is nickel (Ni), the standard electrode potential difference is 1.4 V, and the maximum thickness of a good plating layer is 10 μm. When the substrate metal is copper (Cu), the standard electrode potential difference is 0.86 V, and the maximum plating thickness of good adhesion is 30 μm. When the substrate metal is platinum (Pt)-nickel (Ni) alloy (about 10% Ni), the standard electrode potential difference is about 0.3 V, and a good plated palladium (Pd)-nickel (Ni) alloy layer without remnant stress can be formed, such that no peeling off of a platinum (Pt) plating layer 200 μm thick is observed.

Usually, pinholes are present in the plated layers. Thus, in the case where platinum (Pt) is plated on an electrode disposed within an atomosphere containing halogen gases as in the case of an excimer laser device, it is preferred that the substrate for the plating is selected from a metal or alloy having a low reactivity to halogen gases, such as: gold (Au), copper (Cu), platinum metals, or an alloy of these elements. Further, in the case where the generated heat must be removed effectively as in the case of high-repetition type laser electrode, gold (Au) and copper (Cu) having a high heat conductivity are preferred to be used as the substrate metal.

Furthermore, it is noted that even in the case where the platinum (Pt) is coated by a method other than the electroplating method, the usage of a substrate metal or alloy material selected from gold (Au), silver (Ag), platinum metals, or an alloy of these elements suppresses the development of electric corrosion between the platinum (Pt) coating and the substrate and thereby realizes a secure adhesion.

Figure 27:
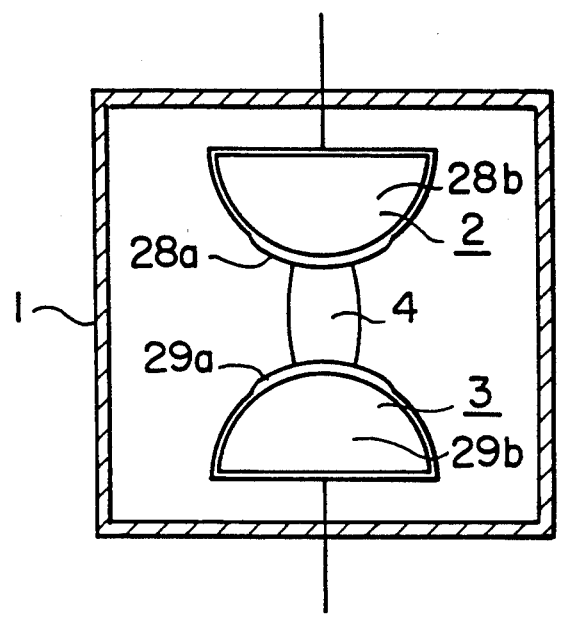
FIG. 27 is a sectional view of another excimer laser device according to the fifteenth aspect of this invention.

When the above specified substrate metal materials are used, the substrate metal materials react a little with the halogen gas. Thus, as shown in FIG. 27, the whole surface of the substrate material may be covered by a thin platinum (Pt) coating to separate the substrate metal material from the halogen gas, the portions of the electrodes exposed to the main discharge 4 being covered with a thick platinum (Pt) plating. An excimer laser device can thus be realized by which the laser gas life and the electrode life can both be prolonged and which exhibits high cost performance.

On the other hand, in the case of the embodiment of FIG. 24, the platinum (Pt) coating layers 28a and 29a cover only those portions of the first main electrode 2 and second main electrode 3 which oppose each other. This reduces the amount of necessary platinum (Pt) and hence the cost of the electrodes.

Figure 25:
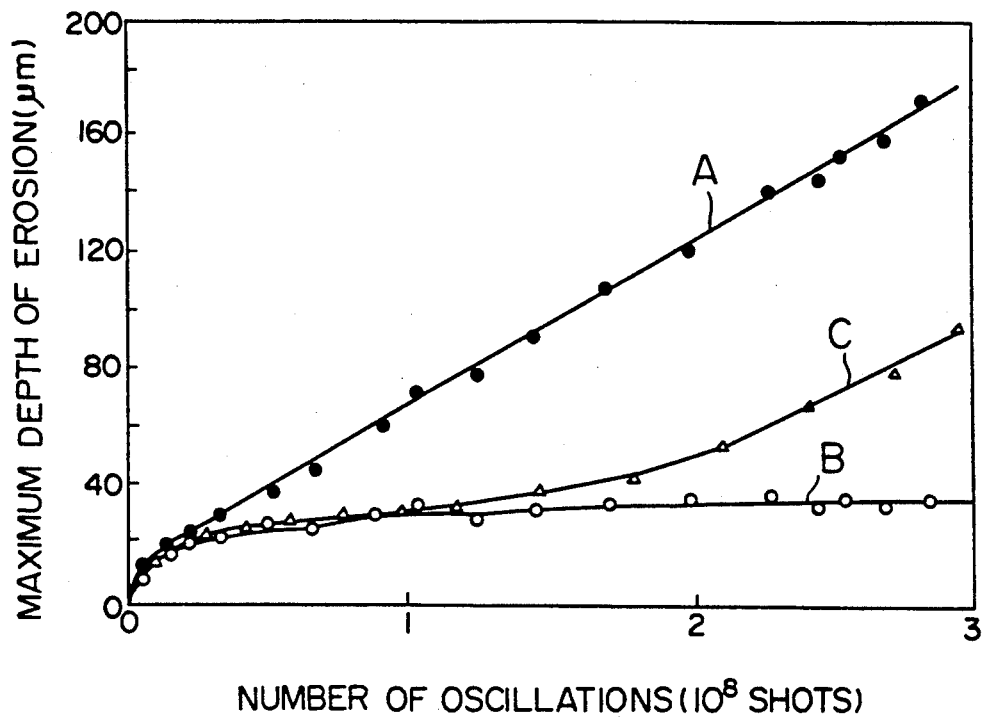
FIG. 25 is a diagram showing the electrode deformation (depth of erosion) caused by sputtering, etc., in the long life test of excimer laser devices.

FIG. 25 is a diagram showing the electrode deformation (depth of erosion) caused by sputtering, etc., in the long life test of excimer laser devices, where the three curves A, B, and C correspond respectively to the cases of nickel (Ni) electrode, an electrode having a platinum (Pt) coating of 200 μm on a palladium (Pd) nickel (Ni) alloy substrate, and an electrode coated with platinum (Pt) layer 30 μm thick. In the case B, copper (Cu) is first plated 30 μm thick on nickel (Ni) base; next, palladium (Pd)-nickel (Ni) alloy (about 10% Ni) is plated 10 μm thick; finally, platinum (Pt) is plated thereon 200 μm thick. In the case C, platinum (Pt) is plated 30 μm thick upon a copper (Cu) base.

Figure 26:
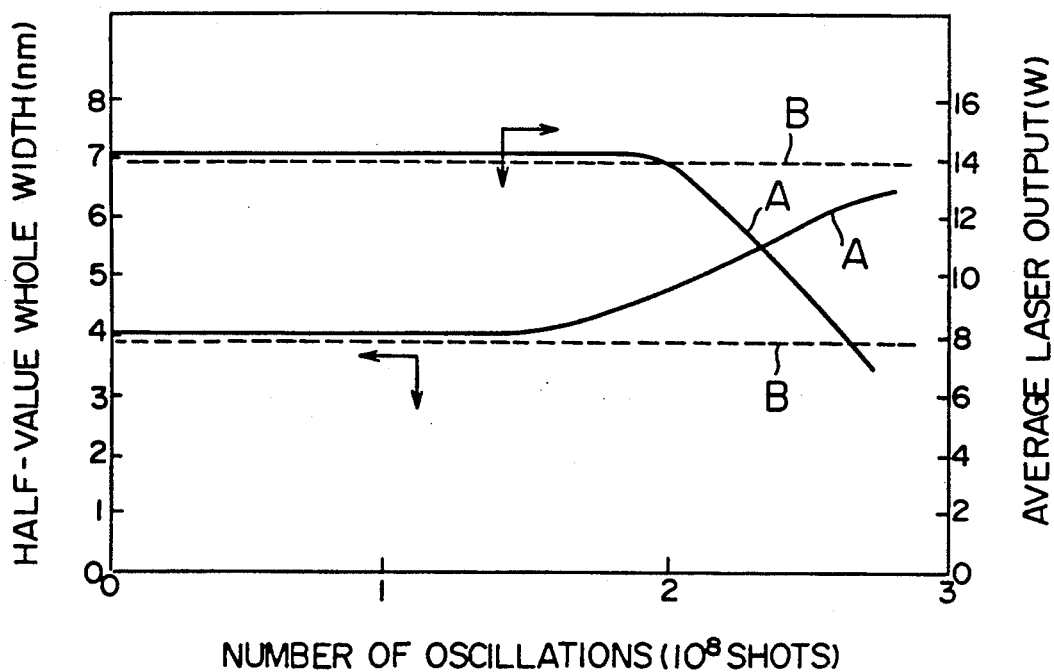
FIG. 26 is a diagram showing the laser beam band pattern (half-value width) changes and the laser output changes accompanying the electrode deformation (erosion), wherein the solid curves A show the case of nickel (Ni) electrode and the dotted curves B show the case of electrode covered with platinum (Pt)

As seen from FIG. 25, the nickel (Ni) electrode is eroded about 180 μm after $3 \times 10^8$ shots. On the other hand, the electrode coated with platinum (Pt) layer 200 μm thick is eroded about 40 μm after $3 \times 10^8$ shots. FIG. 26 is a diagram showing the laser beam band pattern (half-value width) changes and the laser output changes accompanying the electrode deformation (erosion), wherein the solid curves A show the case of nickel (Ni) electrode and the dotted curves B show the case of electrode covered with platinum (Pt). In the case of the nickel (Ni) electrode (curves A), the beam band pattern change (the half-value width increase) and the laser output reduction become conspicuous after a continued operation. However, in the case of the platinum (Pt) covered electrode (curves B), the beam band pattern and the laser output level remain substantially unchanged. The effectiveness of the platinum (Pt) layer according to the ninth aspect is thus apparent. Incidentally, the curves B are displaced vertically in the figure to distinguish them from the overlapping portions of the curves A. Until the depth of erosion reaches 20 μm, the progress of erosion is more rapid than thereafter. Thus, at this early stage, the depth of erosion of the platinum (Pt) covered electrodes B is not much smaller than the depth of erosion of the nickel (Ni) electrodes A. On the other hand, the progresses of erosion after the depth of 20 μm of the nickel (Ni) electrodes A and platinum (Pt) covered electrodes B are markedly differentiated. This turning point in the progress of erosion may vary with the geometric form of the electrode or the input power, but falls within the range of from about 20 μm to 40 μm.

The reason therefor is considered to be as follows. The design of electrodes is done under the assumption that the electrodes are in a perfectly uniform electric field. However, the actual discharge within the excimer laser device is not perfectly uniform. Thus, during the initial period after the beginning of discharge, the discharge is somewhat concentrated to those portions where the electric field is stronger. The portions of the electrodes corresponding thereto are eroded first. Thus, during this initial stage in which the depth of erosion is smaller than the turning point depth (e.g., at 20 μm), the electrodes are eroded into forms corresponding to the actual distribution of the electric field. Thereafter, the progress of the deformation of the electrodes become slower.

Thus, it is apparent that since the platinum (Pt) layer the thickness of which is less than 20 μm is eroded away from the electrodes during the initial stage of operation, the effectiveness of such layer is small. For the purpose of preventing the electrode consumption, a platinum (Pt) layer at least 20 μm thick must be disposed on the electrodes. In order to realize a good platinum (Pt) plating whose thickness is 20 μm or more, the standard electrode potential difference between the substrate metal and platinum (Pt) must be under 1 V. When copper (Cu) is used as the substrate metal (curve C in FIG. 25), the standard electrode potential difference is 0.86 V, such that a good platinum (Pt) plating up to about 30 μm thick can be formed. As seen from FIG. 25, the progress of electrode erosion can be retarded by the platinum (Pt) plating 30 μm thick, compared with the case of the pure nickel (Ni) electrode. However, the progress of erosion for the electrode (curve C) is accelerated after $1.5 \times 10^8$ shots. This is because after the $1.5 \times 10^8$ shots the copper (Cu) base of the electrode is exposed via the sputtering of the platinum (Pt) plating caused by the discharge.

The results of FIG. 25 has been obtained under the condition where streamers are present within the main discharge 4. Under the condition where a uniform main discharge 4 can be obtained without developing the streamers, the progress of electrode erosion is slower. In such case, a platinum (Pt) coating layer not less than 10 μm thick can endure the excimer laser operation of $3 \times 10^8$ shots. This is because the concentration of heat due to streamers does not take place under such circumstances.

Further, as seen from FIGS. 25 and 26, the reduction of the laser output for the nickel (Ni) electrode (decreasing curve A) is accelerated after the number of oscillations of the laser reaches $2 \times 10^8$ shots, which correspond to the depth of electrode erosion of 120 μm in FIG. 25. This acceleration of laser output results from the instability of the discharge occasioned by the electrode deformation. The platinum (Pt) covered electrodes may suffer the same accceleration if the depth of erosion of the electrode exceeds 120 μm. Thus, it is preferred that the thickness of the platinum (Pt) layer is 120 μm or more.

On the other hand, if the thickness of the platinum (Pt) layer exceeds 1 mm, the platinum (Pt) layer alone has a sufficient mechanical strength to serve as an electrode. Thus, no advantage results from increasing the thickness of the platinum (Pt) layer above 1 mm.

In the above embodiment, the substrate metal layer for the top plating has a substantial thickness. However, the same meritorious effects can be obtained by a thin substrate metal layer which is formed by a plating process, etc.

Furthermore, in the above embodiments, the platinum (Pt) coating has been applied to electrodes of excimer laser devices. However, the same meritorious effects can be accomplished by applying a platinum (Pt) coating on the surface of electrodes utilized in a gas or liquid containing halogen gases.

Figure 28:
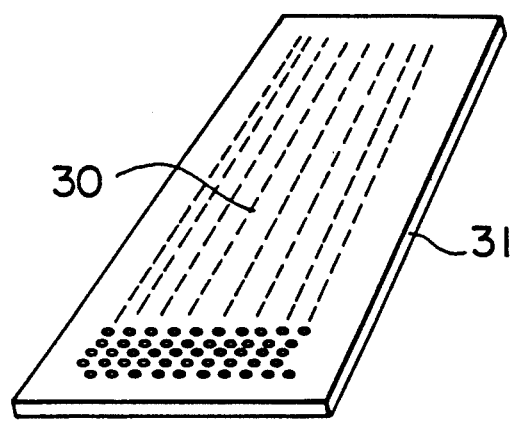
FIGS. 28(A, B) shows perspective views of perforated electrodes.
Figure 28:
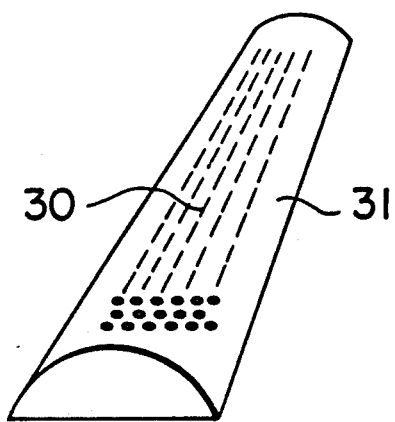
Figure 29:
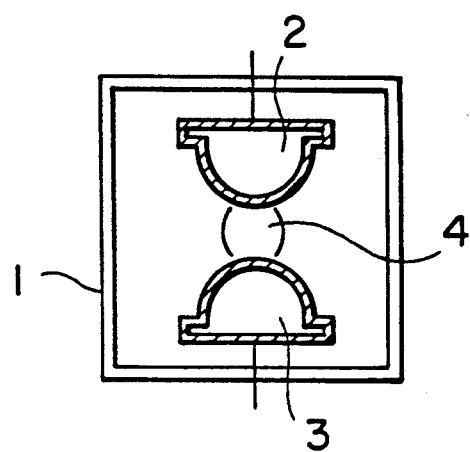
FIG. 29 is a diagrammatic sectional view of the discharge region of a conventional excimer laser device.
Figure 30:
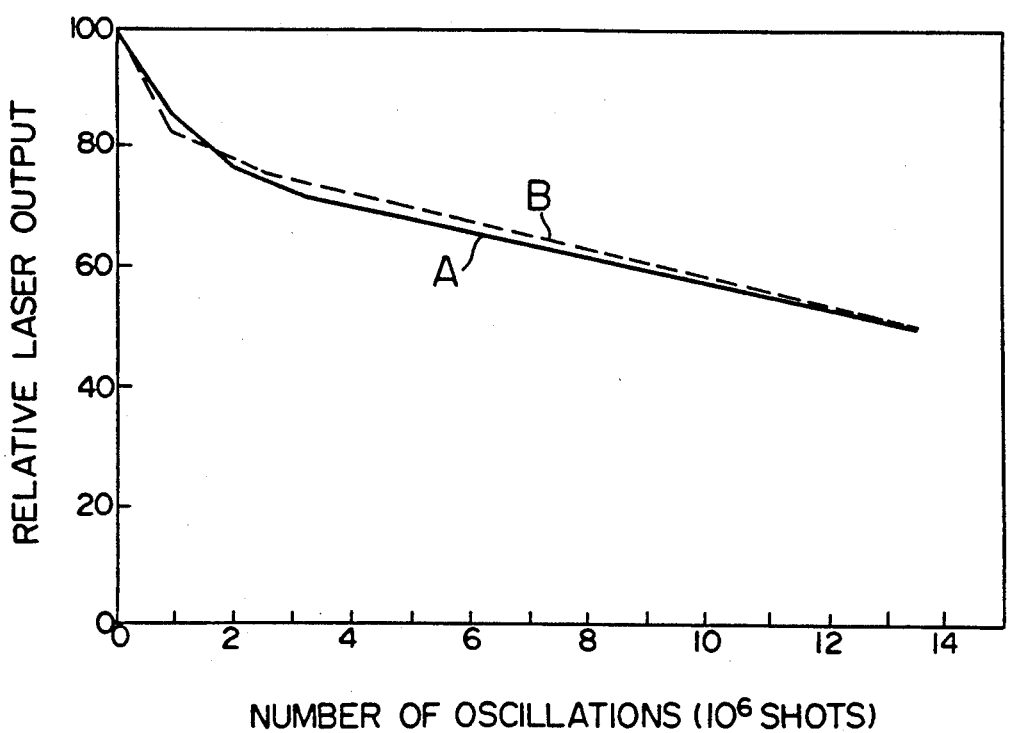
FIG. 30 is a diagram showing the gas lives for the electrode the whole surface of which is covered with platinum (Pt) layer (curve A) and the nickel (Ni) electrode without coating (curve B)
Figure 31:
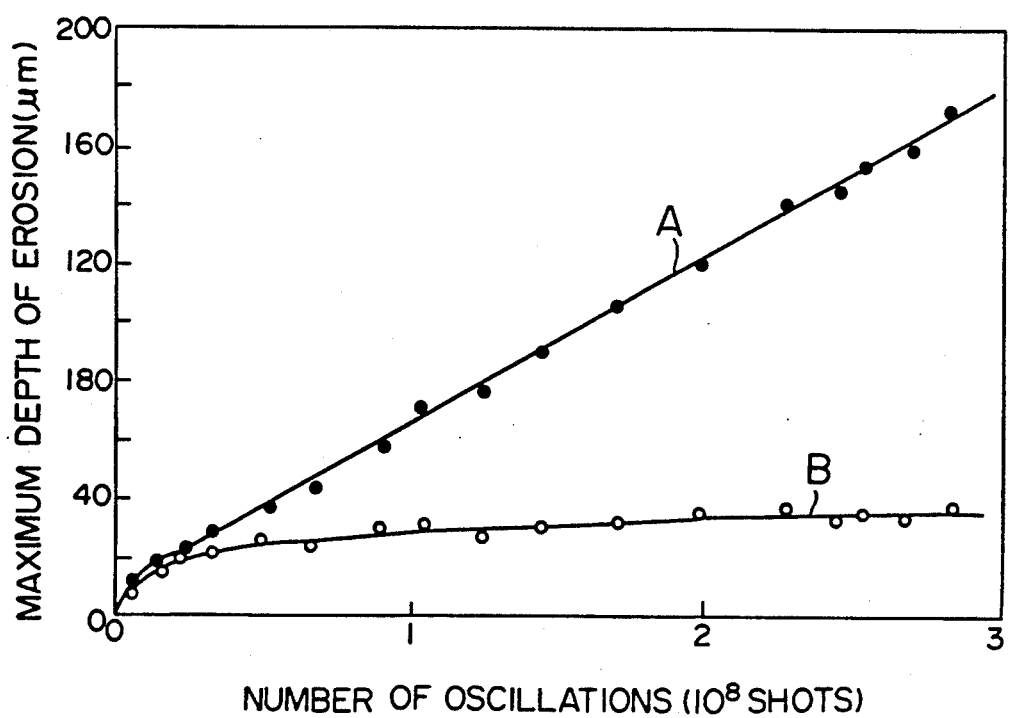
FIG. 31 is a diagram showing the deformation (the depth of erosion) of the electrodes due to sputtering, etc., in long life tests.
Figure 32:
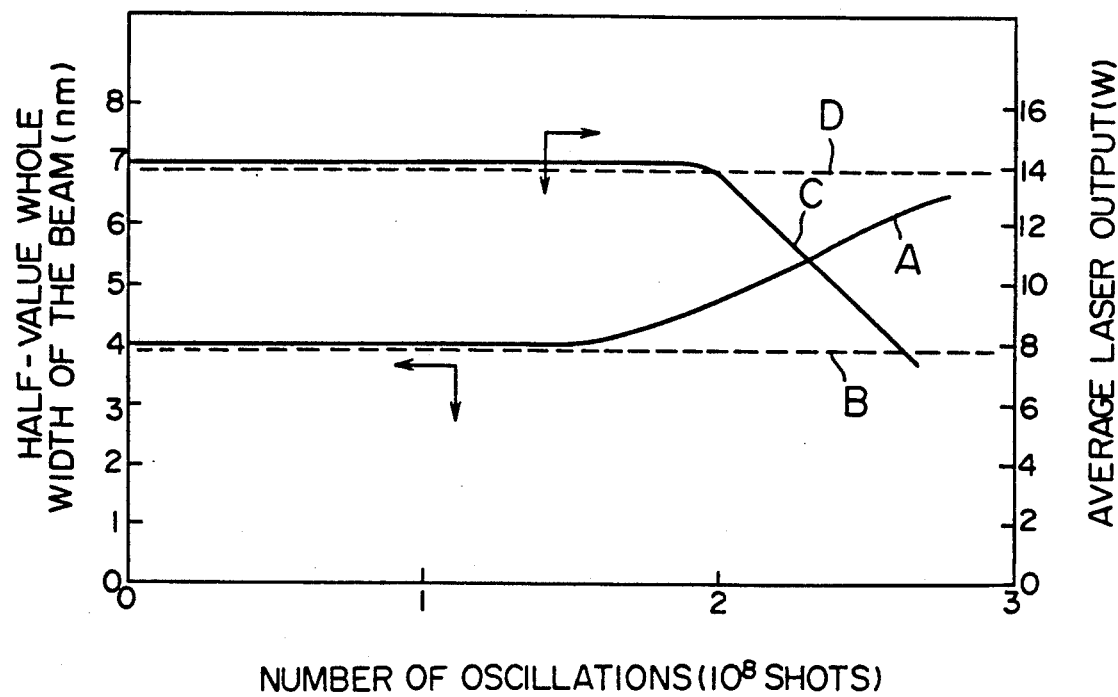
FIG. 32 is a diagram showing the changes of output beam band pattern (half-value wavelength width of the output beam) and the laser output due to electrode deformation (erosion)

The principle of this invention is applicable to excimer laser devices having electrodes of the Chang type, the modified Chang type, the Rogowskii type, or the like. Furthermore, as shown in FIGS. 28(A) and (B), the electrodes may be plate-formed or curved perforated electrode 31 provided with openings 30. Furthermore, in the above embodiments, fluorine (F) is taken as an example of halogens. However, chlorine (Cl) or hydrogen chloride (HCl) may be utilized instead. Further still, ions of fluorine (F) has been taken as an example of a factor contributing to the electrode consumption. However, the radicals of fluorine (F) may be another factor. The electrode consumption via the active species such as ions and radicals of halogens is comprised in the chemical etching against which this invention provides an effective measure.

What is claimed is:

1. An excimer laser device, comprising:
   a housing;
   a laser medium filled in said housing and comprising a mixture of a rare gas and a halogen gas; and
   a pair of main electrodes accommodated within said housing for forming an excitation discharge for said laser medium;
   wherein opposing surface portions of the main electrodes are covered with an etching resistive layer more resistive to chemical etching than nickel to reduce both electrode erosion and deterioration of the laser medium, and wherein said etching resistive layer is made of a platinum (Pt) based alloy consisting of: platinum (Pt) as a primary component and from 5% to 80% by weight of one or more elements selected from the group consisting of rhodium (Rh), ruthenium (Ru), iridium (Ir), and osmium (Os).

2. A excimer laser device, comprising:
   a housing;
   a laser medium filled in said housing and comprising a mixture of a rare gas and a halogen gas; and
   a pair of main electrodes accommodated within said housing for forming an excitation discharge for said laser medium;
   wherein opposing surface portions of the main electrodes are covered with an etching resistive layer more resistive to chemical etching than nickel to reduce both electrode erosion and deterioration of the laser medium, and wherein said etching resistive layer is made of a nickel (Ni) based alloy consisting of: nickel (Ni) as a primary component and from 5% to 50% by weight of one or more elements selected from the group consisting of gold (Au), platinum (Pt), rhodium (Rh), ruthenium (Ru), iridium (Ir), and osmium (Os).

3. An excimer laser device, comprising:
   a housing;
   a laser medium filled in said housing and comprising a mixture of a rare gas and a halogen gas; and
   a pair of main electrodes accommodated within said housing for forming an excitation discharge for said laser medium;
   wherein opposing surface portions of the main electrodes are covered with an etching resistive layer more resistive to chemical etching than nickel to reduce both electrode erosion and deterioration of the laser medium, and wherein said etching resistive layer is made of a metal selected from the group consisting of rhodium (Rh), ruthenium (Ru), iridium (Ir), and osmium (Os); or of an alloy consisting of elements selected from the same group.

4. An excimer laser device, comprising:
   a housing;
   a laser medium filled in said housing and comprising a mixture of a rare gas and a halogen gas; and
   a pair of main electrodes accommodated within said housing for forming an excitation discharge for said laser medium;
   wherein opposing surface portions of the main electrodes are covered with an etching resistive layer more resistive to chemical etching than nickel to reduce both electrode erosion and deterioration of the laser medium, and wherein said etching resistive layer is made of a platinum (Pt) or gold (Au) based alloy consisting of: platinum (Pt) and zirconium oxide ($ZrO_2$); or platinum (Pt), rhodium (Rh), and zirconium oxide ($ZrO_2$); or platinum (Pt), rhodium (Rh), and thorium oxide ($ThO_2$); or gold (Au) and rhodium (Rh); or gold (Au) and zirconium oxide ($ZrO_2$); or gold (Au), rhodium (Rh), and zirconium oxide (ZrO$_2$); or gold (Au), rhodium (Rh), and thorium oxide (ThO$_2$).

5. An excimer laser device, comprising:
a housing;
a laser medium filled in said housing and comprising a mixture of a rare gas and a halogen gas; and
a pair of main electrodes accommodated within said housing for forming an excitation discharge for said laser medium;
wherein at least an opposing surface portion of one of the main electrodes is covered with an etching resistive layer more resistive to chemical etching than nickel to reduce both electrode erosion and deterioration of the laser medium, said etching resistive layer being made of an alloy consisting of platinum (Pt) and gold (Au).

6. An excimer laser device, comprising:
a housing;
a laser medium filled in said housing and comprising a mixture of a rare gas and a halogen gas; and
a pair of main electrodes accommodated within said housing for forming an excitation discharge for said laser medium;
wherein at least an opposing surface portion of one of the main electrodes is covered with an etching resistive layer more resistive to chemical etching than nickel to reduce both electrode erosion and deterioration of the laser medium, said etching resistive layer comprising an alloy material consisting of a high-melting point metal as a primary component and an additive metal resistive to halogen gases, wherein the high-melting point metal is selected from the group consisting of rhodium (Rh), ruthenium (Ru), iridium (Ir), and osmium (Os), and the halogen resistive metal is selected from the group consisting of platinum (Pt) and gold (Au).

7. An excimer laser device as claimed in claim 6, wherein at least a cathode electrode is covered by the etching resistive material.

8. An excimer laser device, comprising:
a housing;
a laser medium filled in said housing and comprising a mixture of a rare gas and halogen gas; and
a pair of main electrodes accommodated within said housing for forming an excitation discharge for said laser medium;
wherein an opposing surface portion of one of the main electrodes is covered with an etching resistive layer more resistive to chemical etching than nickel to reduce both electrode erosion and deterioration of the laser medium, said etching resistive layer comprisng a metal based material consisting of: a primary component metal or alloy having a low reactivity with respect to halogen gases; and an additive material consisting of an oxide or compound or mixture of oxide and compound having a work function not exceeding 4 eV.

9. An excimer laser device as claimed in claim 8, wherein said primary component is selected from nickel (Ni), gold (Au), platinum (Pt), rhodium (Rh), ruthenium (Ru), iridium (Ir), palladium (Pd), or osmium (Os), or an alloy of nickel (Ni) and one or more elements selected from the group consisting of gold (Au), platinum (Pt), rhodium (Rh), ruthenium (Ru), iridium (Ir), palladium (Pd), and osmium (Os); and said additive material is selected from: yttrium oxide, cerium oxide, thorium oxide, lanthanum oxide, barium oxide, stontium oxide, cesium oxide, calcium oxide, and lanthanum hexaboride.

10. An excimer laser device, comprising:
a housing;
a laser medium filled in said housing and comprising a mixture of a rare gas and a halogen gas; and
a pair of main electrodes accommodated within said housing for forming an excitation discharge for said laser medium;
wherein opposing surface portions of the main electrodes are covered with an etching resistive layer more resistive to chemical etching than nickel to reduce both electrode erosion and deterioration of the laser medium, and wherein at least a surface portion of an anode main electrode opposing a cathode main electrode is made of a metal or alloy having a low reactivity with respect to halogen gases, and at least a surface portion of the cathode opposing the anode is made either of a high-melting point metal or alloy material or of a material which easily emits electrons, and wherein the metal or alloy material having low reactivity with respect to halogen gases is made of: an alloy of platinum (Pt), rhodium (Rh), and zirconium oxide (ZrO$_2$); or of an alloy of platinum (Pt), rhodium (Rh), and thorium oxide (ThO$_2$).

11. An excimer laser devive as claimed in claim 10, wherein the high melting point alloy consists of platinum (Pt) and one or more elements selected from the group consisting of rhodium (Rh), ruthenium (Ru), iridium (Ir), and osmium (Os).

12. An excimer laser device, comprising:
a housing;
a laser medium filled in said housing and comprising a mixture of a rare gas and a halogen gas; and
a pair of main electrodes accommodated within said housing for forming an excitation discharge for said laser medium;
wherein opposing surface portions of the main electrodes are covered with an etching resistive layer more resistive to chemical etching than nickel to reduce both electrode erosion and deterioration of the laser medium, and wherein at least a surface portion of an anode main electrode opposing a cathode main eletrode is made of a metal or alloy having a low reactivity with respect to halogen gases, and at least a surface portion of the cathode opposing the anode is made either of a high-melting point metal or alloy material or of a material which easily emits electrons, and wherein the high-melting point metal or alloy material consists of: a metal selected from the group consisting or rhodium (Rh), ruthenium (Ru), iridium (Ir), and osmium (Os); or of an alloy consisting of a primary element selected from the same group and one or more additive elements selected from the same group.

13. An excimer laser device, comprising:
a housing;
a laser medium filled in said housing and comprising a mixture of a rare gas and a halogen gas; and
a pair of main electrodes accommodated within said housing for forming an excitation discharge for said laser medium;
wherein opposing surface portions of the main electrodes are covered with an etching resistive layer more resistive to chemical etching than nickel to reduce both electrode erosion and deterioration of the laser medium, and wherein at least a surface portion of an anode main electrode opposing a cathode main electrode is made of a metal or alloy having a low reactivity with respect to halogen gases, and at least a surface portion of the cathode opposing the anode is made either of a high-melting point metal or alloy material or of a material which easily emits electrons, and wherein the material which easily emits electrons consists of: nickel (Ni) or a metal having low reactivity with respect to halogen gases, as a primary component; and an additive consisting of one or more oxides or compounds which have a work function not exceeding 4 eV.

14. An excimer laser device as claimed in claims 12 or 13, wherein the metal or alloy material having low reactivity with respect to halogen gases is made of: gold (Au), platinum (Pt), rhodium (Rh), ruthenium (Ru), iridium (Ir), palladium (Pd), osmium (Os), or an alloy consisting of one or more elements selected from: gold (Au), platinum (Pt), rhodium (Rh), ruthenium (Ru), iridium (Ir), palladium (Pd), and osmium (Os).

15. An excimer laser device as claimed in claims 12 or 13, wherein the metal or alloy material having a low reactivity with respect to halogen gases is a nickel (Ni) based alloy consisting of: nickel (Ni) as a primary component, and one or more elements selected from the group consisting of: gold (Au), platinum (Pt), rhodium (Rh), ruthenium (Ru), iridium (Ir), palladium (Pd), and osmium (Os).

16. An excimer laser device, comprising:
a housing;
a laser medium filled in said housing and comprising a mixture of a rare gas and a halogen gas; and
a pair of main electrodes accommodated within said housing for forming an excitation discharge for said laser medium;
wherein at least a surface portion of an anode main electrode is covered with an etching resistive layer more resistive to chemical etching than nickel to reduce both electrode erosion and deterioration of the laser medium, said etching resistive layer comprising a platinum (Pt) layer not less than 20 μm thick.

17. An excimer laser device, comprising:
a housing;
a laser medium filled in said housing and comprising a mixture of a rare gas and a halogen gas; and
a pair of main electrodes accommodated within said housing for forming an excitation discharge for said laser medium;
wherein only a surface portion of an anode main electrode opposing a cathode main electrode is covered with an etching resistive layer more resistive to chemical etching than nickel to reduce both electrode erosion and deterioration of the laser medium, said etching resistive layer comprising a platinum (Pt) or gold (Au) layer.

18. An excimer laser device, comprising:
a housing;
a laser medium filled in said housing and comprising a mixture of a rare gas and a halogen gas; and
a pair of main electrodes accommodated within said housing for forming an excitation discharge for said laser medium;
wherein at least a surface portion of at least one of the main electrodes opposing the other main electrode is covered with an etching resistive layer more resistive to chemical etching than nickel to reduce both electrode erosion and deterioration of the laser medium, and wherein at least one of the main electrodes is formed as a hollow cylinder or as a portion of a hollow cylinder made of: platinum (Pt), gold (Au), or a platinum (Pt) or gold (Au) based alloy including platinum (Pt) or gold (Au) as a primary component.

19. An excimer laser device, comprising:
a housing;
a laser medium filled in said housing and comprising a mixture of a rare gas and a halogen gas; and
a pair of main electrodes accommodated within said housing for forming an excitation discharge for said laser medium;
wherein the main electrodes consist of a base material and a layer of an etching resistive material covering an outer surface of the base material, wherein the base material has a heat conductivity greater than that of the etching resistive material of the surface layer.

20. An excimer laser device, comprising:
a housing;
a laser medium filled in said housing and comprising a mixture of a rare gas and a halogen gas; and
a pair of main electrodes accommodated within said housing for forming an excitation discharge for said laser medium;
wherein an opposing surface portion of a nickel base portion of a main electrode has a plurality of grooves formed thereon, and a plate made of a metal selected from the group consisting of: platinum (Pt), rhodium (Rh), ruthenium (Ru), iridium (Ir), osmium (Os), or of an alloy consisting of two or more elements selected from the same group is attached to said opposing surface portion of the plate.

21. An excimer laser device, comprising:
a housing;
a laser medium filled in said housing and comprising a mixture of a rare gas and a halogen gas; and
a pair of main electrodes accommodated wtihin said housing for forming an excitation discharge for said laser medium;
wherein surfaces of base materials of the main electrodes are coated with platinum (Pt) or gold (Au), and at least a substrate of another material is interposed between the platinum (Pt) or gold (Au) coating and the base materials of the main electrodes.

22. An excimer laser device as claimed in claim 21, wherein said interposed substrate comprises a nickel (Ni)-palladium (Pd) alloy layer.

23. An excimer laser device, comprising:
a housing;
a laser medium filled in said housing and comprising a mixture of a rare gas and a halogen gas; and
a pair of main electrodes accommodated within said housing for forming an excitation discharge for said laser medium;
wherein surfaces of the main electrodes are coated with platinum (Pt), and wherein a metal having a standard electrode potential difference of not greater than 1 V with respect to platinum (Pt) is coated on the base material of the main electrodes to form a substrate layer for the platinum (Pt) coating layer.

* * * * *